United States Patent
Johnson et al.

(10) Patent No.: US 11,607,810 B2
(45) Date of Patent: Mar. 21, 2023

(54) ADAPTOR FOR FOOD-SAFE, BIN-COMPATIBLE, WASHABLE, TOOL-CHANGER UTENSILS

(71) Applicant: The Charles Stark Draper Laboratory, Inc., Cambridge, MA (US)

(72) Inventors: David M.S. Johnson, Cambridge, MA (US); Justin Rooney, New York, NY (US); Syler Wagner, Somerville, MA (US); Steven Lines, Brookline, MA (US); Cody Chu, Somerville, MA (US); Anthony Tayoun, Cambridge, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 520 days.

(21) Appl. No.: 16/571,003

(22) Filed: Sep. 13, 2019

(65) Prior Publication Data
US 2020/0086502 A1   Mar. 19, 2020

Related U.S. Application Data

(60) Provisional application No. 62/731,398, filed on Sep. 14, 2018, provisional application No. 62/730,933, (Continued)

(51) Int. Cl.
*B25J 9/16* (2006.01)
*B25J 13/00* (2006.01)
(Continued)

(52) U.S. Cl.
CPC .......... *B25J 9/1666* (2013.01); *B25J 9/0009* (2013.01); *B25J 9/16* (2013.01); *B25J 9/161* (2013.01);
(Continued)

(58) Field of Classification Search
CPC .......................... B25J 9/0009; B25J 15/0052
See application file for complete search history.

(56) References Cited

U.S. PATENT DOCUMENTS

| | | |
|---|---|---|
| 4,512,709 A | 4/1985 | Hennekes |
| 4,513,709 A | 4/1985 | Hennekes |

(Continued)

FOREIGN PATENT DOCUMENTS

| | | |
|---|---|---|
| CN | 106313068 A | 1/2017 |
| CN | 107092209 A | 8/2017 |

(Continued)

OTHER PUBLICATIONS

Yang et al., "Obstacle Avoidance through Deep Networks based Intermediate Perception", Apr. 27, 2017, The Robotics Instiute, Carnegie Mellon University (Year: 2017).

(Continued)

*Primary Examiner* — Kira Nguyen
(74) *Attorney, Agent, or Firm* — Hamilton, Brook, Smith & Reynolds, P.C.

(57) ABSTRACT

Robots, including robot arms, can interface with other modules to affect the world surrounding the robot. However, designing modules from scratch when human analogues exist is not efficient. In an embodiment, a mechanical tool, converted from human use, to be used by robots includes a monolithic adaptor having two interface components. The two interface components include a first interface component cabal be of mating with an actuated mechanism on the robot side, the second interface capable of clamping to an existing utensil. In such a way, utensils that are intended for humans can be adapted for robots and robotic arms.

24 Claims, 16 Drawing Sheets

Related U.S. Application Data filed on Sep. 13, 2018, provisional application No. 62/730,703, filed on Sep. 13, 2018, provisional application No. 62/730,918, filed on Sep. 13, 2018, provisional application No. 62/730,934, filed on Sep. 13, 2018, provisional application No. 62/730,947, filed on Sep. 13, 2018.

(51) Int. Cl.

| | |
|---|---|
| *B25J 13/08* | (2006.01) |
| *G06N 3/08* | (2023.01) |
| *G10L 15/22* | (2006.01) |
| *B65G 1/137* | (2006.01) |
| *B25J 9/00* | (2006.01) |
| *B25J 15/00* | (2006.01) |
| *G06Q 10/0631* | (2023.01) |
| *B25J 11/00* | (2006.01) |
| *B25J 15/04* | (2006.01) |
| *B25J 19/02* | (2006.01) |
| *G05D 1/02* | (2020.01) |
| *B25J 19/00* | (2006.01) |
| *G06V 40/20* | (2022.01) |
| *H04L 67/12* | (2022.01) |
| *G05B 19/4061* | (2006.01) |
| *A47J 44/00* | (2006.01) |

(52) U.S. Cl.
CPC ........... *B25J 9/1633* (2013.01); *B25J 9/1653* (2013.01); *B25J 9/1664* (2013.01); *B25J 9/1674* (2013.01); *B25J 9/1676* (2013.01); *B25J 9/1682* (2013.01); *B25J 9/1687* (2013.01); *B25J 9/1697* (2013.01); *B25J 11/0045* (2013.01); *B25J 13/003* (2013.01); *B25J 13/085* (2013.01); *B25J 13/088* (2013.01); *B25J 15/0052* (2013.01); *B25J 15/0408* (2013.01); *B25J 19/0083* (2013.01); *B25J 19/023* (2013.01); *B65G 1/137* (2013.01); *G05D 1/02* (2013.01); *G06N 3/08* (2013.01); *G06Q 10/06316* (2013.01); *G06V 40/28* (2022.01); *G10L 15/22* (2013.01); *A47J 44/00* (2013.01); *G05B 19/4061* (2013.01); *G05B 2219/32335* (2013.01); *G05B 2219/39001* (2013.01); *G05B 2219/39091* (2013.01); *G05B 2219/39319* (2013.01); *G05B 2219/39342* (2013.01); *G05B 2219/39468* (2013.01); *G05B 2219/40201* (2013.01); *G05B 2219/40202* (2013.01); *G05B 2219/40411* (2013.01); *G05B 2219/40497* (2013.01); *G05B 2219/45111* (2013.01); *G05B 2219/49157* (2013.01); *G05B 2219/50391* (2013.01); *H04L 67/12* (2013.01)

(56) References Cited

U.S. PATENT DOCUMENTS

| | | |
|---|---|---|
| 4,604,787 A | 8/1986 | Silvers |
| 4,611,377 A | 9/1986 | McCormick |
| 4,624,043 A | 11/1986 | Bennett |
| 4,676,142 A | 6/1987 | McCormick |
| 4,875,275 A | 10/1989 | Hutchinson et al. |
| 4,896,357 A | 1/1990 | Hatano |
| 4,904,514 A | 2/1990 | Morrison et al. |
| 5,018,266 A | 5/1991 | Hutchinson et al. |
| 5,044,063 A | 9/1991 | Voellmer |
| 5,131,706 A | 7/1992 | Appleberry |
| 5,136,223 A | 8/1992 | Karakama |
| 5,360,249 A | 11/1994 | Monforte et al. |
| 5,396,346 A | 3/1995 | Nakayama |
| 5,774,841 A | 6/1998 | Salazar et al. |
| 5,879,277 A | 3/1999 | Dettman et al. |
| 6,223,110 B1 | 4/2001 | Rowe et al. |
| 6,427,995 B1 | 8/2002 | Steinwall |
| 6,569,070 B1 | 5/2003 | Harrington et al. |
| 6,678,572 B1 | 1/2004 | Oh |
| 8,095,237 B2 | 1/2012 | Habibi et al. |
| 9,186,795 B1 | 11/2015 | Edsinger et al. |
| 9,189,742 B2 | 11/2015 | London |
| 9,259,840 B1 | 2/2016 | Chen |
| 9,346,164 B1 | 5/2016 | Edsinger et al. |
| 9,427,876 B2 | 8/2016 | Mozeika et al. |
| 9,615,066 B1 | 4/2017 | Tran et al. |
| 9,621,984 B1 | 4/2017 | Chu |
| 9,659,225 B2 | 5/2017 | Joshi et al. |
| 9,744,668 B1 | 8/2017 | Russell et al. |
| 9,547,306 B2 | 10/2017 | Sepulveda |
| 9,800,973 B1 | 10/2017 | Chatot et al. |
| 9,801,517 B2 | 10/2017 | High et al. |
| 10,131,053 B1 | 11/2018 | Sampedro et al. |
| 10,427,306 B1 | 10/2019 | Quinlan et al. |
| 11,016,491 B1 | 5/2021 | Millard |
| 11,116,593 B2 | 9/2021 | Hashimoto et al. |
| 11,351,673 B2 | 6/2022 | Zito et al. |
| 2002/0144565 A1 | 10/2002 | Ambrose |
| 2002/0151848 A1 | 10/2002 | Capote et al. |
| 2002/0158599 A1 | 10/2002 | Fujita |
| 2002/0181773 A1 | 12/2002 | Higaki et al. |
| 2003/0060930 A1 | 3/2003 | Fujita |
| 2004/0039483 A1 | 2/2004 | Kemp et al. |
| 2004/0172380 A1 | 9/2004 | Zhang |
| 2005/0004710 A1 | 1/2005 | Shimomura et al. |
| 2005/0171643 A1 | 8/2005 | Sabe et al. |
| 2005/0193901 A1* | 9/2005 | Buehler .................. A47J 44/00 99/468 |
| 2005/0283475 A1 | 12/2005 | Beranik |
| 2006/0137164 A1 | 6/2006 | Kraus |
| 2006/0141200 A1 | 6/2006 | D'Amdreta |
| 2006/0165953 A1 | 7/2006 | Castelli |
| 2007/0233321 A1 | 10/2007 | Suzuki |
| 2007/0274812 A1 | 11/2007 | Ban et al. |
| 2007/0276539 A1 | 11/2007 | Habibi et al. |
| 2008/0059178 A1 | 3/2008 | Yamamoto et al. |
| 2008/0161970 A1 | 7/2008 | Adachi et al. |
| 2008/0177421 A1 | 7/2008 | Cheng et al. |
| 2008/0201016 A1 | 8/2008 | Finlay |
| 2008/0237921 A1 | 10/2008 | Butterworth |
| 2009/0075796 A1 | 3/2009 | Doll |
| 2009/0292298 A1 | 11/2009 | Lin et al. |
| 2010/0114371 A1 | 5/2010 | Tsukaka et al. |
| 2010/0292707 A1 | 11/2010 | Ortmaier |
| 2011/0060462 A1 | 3/2011 | Aurnhammer et al. |
| 2011/0125504 A1 | 5/2011 | Ko et al. |
| 2011/0238212 A1 | 9/2011 | Shirado et al. |
| 2011/0256995 A1* | 10/2011 | Takazakura .............. B25J 15/04 483/7 |
| 2012/0016678 A1 | 1/2012 | Gruber |
| 2012/0255388 A1 | 10/2012 | Mcclosky |
| 2012/0290134 A1 | 11/2012 | Zhao et al. |
| 2013/0079930 A1 | 3/2013 | Mistry |
| 2013/0103918 A1* | 4/2013 | Dictos .................... G06F 3/0656 711/171 |
| 2014/0067121 A1 | 3/2014 | Brooks |
| 2014/0163736 A1 | 6/2014 | Azizian et al. |
| 2014/0316636 A1 | 10/2014 | Hong et al. |
| 2015/0032260 A1 | 1/2015 | Yoon et al. |
| 2015/0051734 A1 | 2/2015 | Zheng |
| 2015/0052703 A1 | 2/2015 | Lee et al. |
| 2015/0114236 A1 | 4/2015 | Roy |
| 2015/0117156 A1 | 4/2015 | Xu et al. |
| 2015/0148953 A1 | 5/2015 | Laurent et al. |
| 2015/0149175 A1 | 5/2015 | Hirata et al. |
| 2015/0178953 A1 | 5/2015 | Laurent |
| 2015/0277430 A1 | 10/2015 | Linnell et al. |
| 2015/0375402 A1 | 12/2015 | D'Andreta |
| 2016/0016315 A1 | 1/2016 | Kuffner et al. |
| 2016/0073644 A1* | 3/2016 | Dickey .................... A21C 9/08 700/233 |
| 2016/0075023 A1 | 3/2016 | Sisbot |

(56) References Cited

U.S. PATENT DOCUMENTS

| | | | |
|---|---|---|---|
| 2016/0103202 A1 | 4/2016 | Sumiyoshi et al. |
| 2016/0291571 A1 | 10/2016 | Cristiano |
| 2016/0372138 A1 | 12/2016 | Shinkai et al. |
| 2017/0004406 A1 | 1/2017 | Aghamohammadi |
| 2017/0080565 A1 | 3/2017 | Dalibard |
| 2017/0087722 A1 | 3/2017 | Aberg et al. |
| 2017/0133009 A1 | 5/2017 | Cho et al. |
| 2017/0168488 A1 | 6/2017 | Wierzynski |
| 2017/0178352 A1 | 6/2017 | Harmsen et al. |
| 2017/0326728 A1 | 11/2017 | Prats |
| 2017/0334066 A1 | 11/2017 | Levine |
| 2017/0354294 A1 | 12/2017 | Shivaiah |
| 2017/0361461 A1 | 12/2017 | Tan |
| 2017/0361468 A1 | 12/2017 | Cheuvront et al. |
| 2018/0043952 A1 | 2/2018 | Ellerman et al. |
| 2018/0056520 A1 | 3/2018 | Ozaki |
| 2018/0070776 A1* | 3/2018 | Ganninger | A47J 44/02 |
| 2018/0121994 A1 | 5/2018 | Matsunaga et al. |
| 2018/0144244 A1 | 5/2018 | Masoud et al. |
| 2018/0147718 A1 | 5/2018 | Oleynik |
| 2018/0147723 A1 | 5/2018 | Vijayanarasimhan |
| 2018/0150661 A1 | 5/2018 | Hall et al. |
| 2018/0200014 A1 | 7/2018 | Bonny et al. |
| 2018/0200885 A1 | 7/2018 | Ikeda et al. |
| 2018/0202819 A1 | 7/2018 | Mital |
| 2018/0214221 A1 | 8/2018 | Crawford et al. |
| 2018/0257221 A1* | 9/2018 | Toothaker | B25J 19/0033 |
| 2018/0275632 A1 | 9/2018 | Zhang et al. |
| 2018/0338504 A1* | 11/2018 | Lavri | A21C 3/02 |
| 2018/0345479 A1 | 12/2018 | Martino et al. |
| 2018/0348783 A1 | 12/2018 | Pitzer et al. |
| 2018/0354140 A1 | 12/2018 | Watanabe |
| 2019/0001489 A1 | 1/2019 | Hudson et al. |
| 2019/0039241 A1 | 2/2019 | Langenfeld et al. |
| 2019/0049970 A1 | 2/2019 | Djuric et al. |
| 2019/0056751 A1 | 2/2019 | Ferguson et al. |
| 2019/0066680 A1 | 2/2019 | Woo et al. |
| 2019/0212441 A1 | 7/2019 | Casner et al. |
| 2019/0291277 A1 | 9/2019 | Oleynik |
| 2019/0310611 A1 | 10/2019 | Jain |
| 2019/0321989 A1 | 10/2019 | Anderson et al. |
| 2019/0381617 A1* | 12/2019 | Patrini | B25J 15/0466 |
| 2020/0023520 A1 | 1/2020 | Yoshizumi |
| 2020/0030966 A1 | 1/2020 | Hasegawa |
| 2020/0047349 A1* | 2/2020 | Sinnet | A47J 37/1219 |
| 2020/0070355 A1 | 3/2020 | Neumann et al. |
| 2020/0073358 A1 | 3/2020 | Dedkov et al. |
| 2020/0073367 A1 | 3/2020 | Nguyen et al. |
| 2020/0086437 A1 | 3/2020 | Johnson |
| 2020/0086482 A1 | 3/2020 | Johnson |
| 2020/0086485 A1 | 3/2020 | Johnson |
| 2020/0086487 A1 | 3/2020 | Johnson |
| 2020/0086497 A1 | 3/2020 | Johnson |
| 2020/0086498 A1 | 3/2020 | Johnson |
| 2020/0086503 A1 | 3/2020 | Johnson |
| 2020/0086509 A1 | 3/2020 | Johnson |
| 2020/0087069 A1 | 3/2020 | Johnson |
| 2020/0090099 A1 | 3/2020 | Johnson |
| 2020/0298403 A1* | 9/2020 | Nilsson | B25J 9/1692 |
| 2022/0066456 A1 | 3/2022 | Ebrahimi et al. |

FOREIGN PATENT DOCUMENTS

| | | | |
|---|---|---|---|
| DE | 3723329 A | | 1/1988 |
| DE | 3823102 A1 | | 1/1990 |
| EP | 138461 A2 | | 4/1985 |
| EP | 474881 A1 | | 3/1992 |
| EP | 1145804 A1 | | 10/2001 |
| EP | 2011610 A1 | | 1/2019 |
| FR | 3015334 A1 | | 6/2015 |
| GB | 2550396 A | | 11/2017 |
| JP | 2004295620 | | 10/2004 |
| JP | 200849462 A | | 3/2008 |
| JP | 2020028957 | | 2/2020 |
| WO | 99/03653 A1 | | 1/1999 |
| WO | 2005072917 A1 | | 11/2005 |
| WO | 2007/122717 A1 | | 11/2007 |
| WO | 2009045827 A2 | | 4/2009 |
| WO | 20150117156 A | | 8/2015 |
| WO | 20170197170 A1 | | 11/2017 |
| WO | 20180133861 A1 | | 7/2018 |
| WO | 2020056279 A1 | | 3/2020 |
| WO | 2020056295 A1 | | 3/2020 |
| WO | 2020056301 A1 | | 3/2020 |
| WO | 2020056353 A1 | | 3/2020 |
| WO | 2020056362 A1 | | 3/2020 |
| WO | 2020056373 A1 | | 3/2020 |
| WO | 2020056374 A1 | | 3/2020 |
| WO | 2020056375 A1 | | 3/2020 |
| WO | 2020056376 A1 | | 3/2020 |
| WO | 2020056377 A1 | | 3/2020 |
| WO | 2020056380 A1 | | 3/2020 |

OTHER PUBLICATIONS

Anandan, T.M., "The Shrinking Footprint of Robot Safety", Robotics Online, Oct. 6, 2014. https://www.robotics.org/content-detail.cfm/Industrial-Robotics-Industry-Insights/The-Shrinking-Footprint-of-Robot-Safety/content_id/5059.

Blutinger, J., et al., "Scoop: Automating the Ice Cream Scooping Process", Introduction to Robotics MECE E4602, Group 8 Final Project, Dec. 2016.

Bollini, M., et al., "Interpreting and Executing Recipes with a Cooking Robot", Experimental Robotics, 2013.

Cao, Z., et al. "Realtime Multi-Person 2D Pose Estimation using Part Affinity Fields", Proceedings of the IEEE Conference on Computer Vision and Pattern Recognition. 2017.

Dantam, N.T., et al. "Incremental Task and Motion Planning a Constraint-Based Approach", Robotics: Science and Systems 12, 00052, 2016.

Ferrer-Mestres, J., et al., "Combined Task and Motion Planning as a Classical AI Planning" arXiv preprint arXiv: 1706.06927, 2017—arxiv.org; Jun. 21, 2017.

Kaelbling, L.P, et al., "Integrated task and motion planning in beliefs space" The International Journal of Robotics Research; 0(0) 1-34; 2013.

Martinez, J., et al., "On human motion prediction using recurrent neural networks." Proceedings of the IEEE Conference on Computer Vision and Pattern Recognition. 2017.

Nedunuri, S., et al., "SMT-Based Synthesis of Integrated Task and Motion Plan from Plan Outlines"; the Proceedings of the 2014 IEEE Inti. Conf. on Robotics and Automation (ICRA2014).

Saxena, A., et al., "RoboBrain: Large-Scale Knowledge Engine for Robots", arXiv preprint:arXiv:1412.0691 (2014).

Schenck, C., et al., "Learning Robotic Manipulation of Granular Media", 1st Conference on Robot Learning, arXiv: 1709.02833, Oct. 25, 2017.

Shimizu, T. and Kubota, T., "Advanced Sampling Scheme Based on Environmental Stiffness for a Smart Manipulator", Robot Intelligence Technology and Applications, pp. 19-208. 2012.

Srivastava, S., et al. "Combined Task and Motion Planning Through an Extensible Planner-Independent Interface Layer"; 2014 IEEE international conference on robotics and automation (ICRA), 639-646.

Stentz, A., et al., "A Robotic Excavator for Autonomous Truck Loading", in Proceedings of the IEEE/RSJ International Conference on Intelligent Robotic Systems, 1998.

Villegas, et al., "Learning to Generate Long-term Future via Hierarchical Prediction", in Proceedings of the 34th International Conference on Machine Learning (ICML), 2017.

Walker, J., et al.,"The pose knows: Video forecasting by generating pose futures", in the IEEE International Conference on Computer Vision (ICCV), Oct. 2017.

Watson, J,. Kevin, et al. "Use of Voice Recognition for Control of a Robotic Welding Workcell", IEEE Control Systems Magazine; p. 16-18; (ISSN 0272-1708); 7 , Jun. 1, 1987.

(56) References Cited

OTHER PUBLICATIONS

Wong, J.M., et al., "SegICP-DSR: Dense Semantic Scene Reconstruction and Registration", Draper, arXiv: 1711 02216; Nov. 6, 2017.
Wong, J.M., et al., "SegICP: Integrated Deep Semantic Segmentation and Pose Estimation", Massachusetts Institute of Technology, 2017 IEEE/RSJ International Conference on Intelligent Robots and Systems (IROS); Sep. 5, 2017.
Wu, J., et al., "Real-Time Object Pose Estimation with Pose Interpreter Networks", IEEE/RSJ International Conference on Intelligent Robots and Systems (IROS), 2018.
Ye, G., et al., "Demonstration-Guided Motion Planning" Robotics Research. Springer Tracts in Advanced Robotics, vol. 100, 2017.
International Search Report and Written Opinion for PCT/US2019/051148 dated Dec. 12, 2019 entitled "Food-Safe, Washable, Thermally-Conductive Robot Cover".
Anonymous: "Pate a pizza fine—Notre recette avec photos—Meilleur du Chef," Retrieved from the Internet: URL: https://www.meilleurduchef.com/fr/recette/pate-pizza-fine.html# [retrieved on Dec. 5, 2019].
International Search Report and Written Opinion for PCT/US2019/051176 dated Dec. 12, 2019 entitled "Determining How to Assemble a Meal".
International Search Report and Written Opinion for PCT/US2019/051175 dated Jan. 3, 2020 entitled Stopping Robot Motion Based on Sound Cues.
Dexai Robotics: "Alfred Sous-Chef scooping ice-cream" Youtube, retrieved from Internet Jun. 8, 2018. https://www.youtube.com/watch?v=caNG4qrZhRU.
International Search Report and Written Opinion for PCT/US2019/051179 dated Jan. 9, 2020 entitled "An Adaptor tor Food-Safe, Bin-Compatible, Washable, Tool-Changer Utensils".
International Search Report and Written Opinion for PCT/US2019/051177 dated Jan. 9, 2020 entitled "Voice Modification to Robot Motion Plans".
International Search Report and Written Opinino for PCT/US2019/051183 dated Jan. 14, 2020 entitled "Locating and Attaching Interchangeable Tools In-Situ".
International Search Report and Written Opinion for PCT/US2019/051067 dated Jan. 16, 2020 entitled "Robot Interaction With Human Co-Workers".
International Search Report and Written Opinion for PCT/US2019/051161 dated Jan. 15, 2020 entitled "Food-Safe, Washable Interface for Exchanging Tools".
ATI Industrial Automation: Automatic/RoboticTool Changers, "Automatic/RoboticTool Changes", Tool Changer News. Downloaded from Internet Feb. 4, 2020. https://www.ati-ia.com/products/toolchanger/robot_tool_changer.aspx.
Draper—"A 'Preceptive Robot' Earns Draper Spots as KUKA Innovation Award Finalist" Aug. 30, 2017, retrieved from Internet from Feb. 5, 2020. https://www.draper.com/news-releases/perceptive-robot-eams-draper-spot-kuka-innovation-award-finalist.
"Draper Spins Out Dexai Robotics", Mar. 21, 2019, retrieved from Internet from Feb. 5, 2020. https://www.draper.com/news-releases/draper-spins-out-dexai-robotics.
Dynamic Robotic Manipulation—KUKA Innovation—Finalist Spotlight—Apr. 26, 2018 retrieved from Internet Feb. 5, 2020. https://youtube.com/watch?v=7wGc-4uqOKw.
Siciliano, B., et al. "Chapter 8—Motion Control—Robotics Modelling Planning and Control", In: Robotics Modelling Planning and Control, Dec. 23, 2009.
Siciliano, B., et al. "Chapter 9—Force Control—Robotics Modelling Planning and Control", in: Robotics Modelling Planning and Control, Dec. 23, 2009.
International Search Report and Written Opinion for PCT/US2019/051040 dated Feb. 7, 2020 entitled "Manipulating Fracturable and Deformable Materials Using Articulated Manipulators".
International Search Report and Written Opinion for PCT/US2019/051180 dated Jan. 31, 2020 entitled "One-Click Robot Order".
International Search Report and Written Opinion for PCT/US2019/051061 dated Apr. 3, 2020 titled "Controlling Robot Torque and Velocity Based on Context".
Olin College of Engineering, "Autonomous Tool Changer" Draper 2016-2017, retrieved from Internet Feb. 5, 2020. http://www.olin.edu/sites/default/files/draperarchival2.pdf.
Olin College of Engineering, Autonomous Tool Changer, MoMap and the Future, "How Can We Enable a Robotic Arm to Change and Use Human Tools Autonomously". Date unknown.
Feddema, John T., et al., Model-Based Visual Feedback Control for a Hand-Eye Coordinated Robotic System, Aug. 1992, IEEE, vol. 25, Issue: 8, pp. 21-31 (Year: 1992).
Dexai Robotics: "A Robot Company is Born", retrieved from Internet from Feb. 5, 2020. https://draper.com/dexai-robotics.
Charabaruk, Nicholas; "Development of an Autonomous Omnidirectional Hazardous Material Handling Robot";. University of Ontario Institute of Technology (Canada). ProQuest Dissertations Publishing, 2015. 10006730. (Year: 2015).
Langsfeld, Joshua D..; "Learning Task Models for Robotic Manipulation of Nonrigid Objects"; University of Maryland, College Park. ProQuest Dissertations Publishing, 2017. 10255938. (Year: 2017).
Rennekamp, T., et al., "Distributed Sensing and Prediction of Obstacle Motions for Mobile Robot Motion Planning," 2006, IEEE, International Conference on Intelligent Robots and Systems, pp. 4833-4838 (Year: 2006).

\* cited by examiner

ADAPTOR FOR FOOD-SAFE, BIN-COMPATIBLE, WASHABLE, TOOL-CHANGER UTENSILS

RELATED APPLICATIONS

This application claims the benefit of U.S. Provisional Application No. 62/730,947, filed on Sep. 13, 2018, U.S. Provisional Application No. 62/730,703, filed on Sep. 13, 2018, U.S. Provisional Application No. 62/730,933, filed on Sep. 13, 2018, U.S. Provisional Application No. 62/730,918, filed on Sep. 13, 2018, U.S. Provisional Application No. 62/730,934, filed on Sep. 13, 2018 and U.S. Provisional Application No. 62/731,398, filed on Sep. 14, 2018. The entire teachings of the above applications are incorporated herein by reference.

This application is related to U.S. patent application Ser. No. 16/570,100, U.S. patent application Ser. No. 16/570,855, U.S. patent application Ser. No. 16/570,955, U.S. patent application Ser. No. 16/570,915, U.S. patent application Ser. No. 16/570,976, U.S. patent application Ser. No. 16/570,736, U.S. patent application Ser. No. 16/571,025, U.S. patent application Ser. No. 16/570,606, U.S. patent application Ser. No. 16/571,040, and U.S. patent application Ser. No. 16/571,041, all filed on the same day, Sep. 13, 2019.

The entire teachings of the above applications are incorporated herein by reference.

BACKGROUND

Traditionally, the food industry employs human labor to manipulate ingredients with the purpose of either assembling a meal such as a salad or a bowl, or packing a box of ingredients such as those used in grocery shopping, or preparing the raw ingredients. Robots have not yet been able to assemble complete meals from prepared ingredients in a food-service setting such as a restaurant, largely because the ingredients are arranged unpredictably and change shape in difficult-to-predict ways rendering traditional methods to move material ineffective without extensive modifications to existing kitchens. Additionally, traditional material handling methods are ill-suited to moving cooked foods without altering their texture and taste-profile. These difficulties arise because the friction, stiction, and viscosity of commonly consumed foods cause auger, conveyor, and suction mechanisms to become clogged and soiled, while these mechanisms simultaneously impart forces on the foodstuffs which alter their texture, consistency, and taste-profile in unappetizing ways.

SUMMARY

Widely-available food serving tools (e.g., spoons, ladles, measuring cups, dishers (aka scoopers), tongs, etc.) are designed to be operated by human hands, not by robotic end effectors. There is a current need to develop custom robotic end effector solutions targeted at an increasingly automated food-service industry. Specifically, a need exists for an adaptor to allow for existing servicing tools to be attached to and controlled by a robot. The ability to convert existing utensils from human use to robot use is beneficial because existing utensils are already widely used, understood, and satisfy the required safety, sanitary and regulatory standards including NSF/ANSI 169. Providing an adaptor for existing tools and utensils, instead of designing and creating new robot focused tools, allows for a simpler, cheaper and safer transition to a robotic food service environment.

In an embodiment, an adaptor, and a corresponding method for use, includes an element with a first interface component and second interface component. The first interface component is configured to removably mate with a connector of a robot and the second interface component is configured to attach to a tool. The tool may be controllable by moving the connector when the first interface component is mated with the connector and the second interface component is attached to the tool. The tool may be a static tool such as a spatula, rake, peeler, whisk, strainer, knife, ladle, or spoon.

In an embodiment, the adaptor may further include an actuator, coupled to the element such that the actuator can be controlled by the robot when the first interface component is mated with the connector and an actuatable tool is controllable by moving the connector and the actuator when the first interface component is mated with the connector and the second interface component is attached to the actuatable tool. The actuatable tool may be a spice mill, egg beater, frother, crusher, tongs, disher, or ice cream scooper.

In such embodiments, the actuator may be coupled to the element at a port, the port configured to allow a connection between the connector and the actuator when the first interface component is mated with the connector. The actuator may be a linear actuator configured to move a joint of the attached actuatable tool. The actuator may be a rotary actuator configured to move a joint of the attached actuatable tool. The adaptor may include a spring configured to apply a tensile force opposing movement created by the actuator.

In an embodiment, when the actuator is a rotary actuator, it may include a drive shaft having a proximal end coupled to the element, and having a distal end having a pinion and a rack, coupled to the second interface component, configured to mate with the pinion of the drive shaft, and further configured to apply force to the joint of the actuatable tool through the second interface component when the drive shaft is rotated and the second interface component is attached to the actuatable tool.

The adaptor may further comprise a visual marker attached to the element configured to provide, to an imaging system at least one of the position and the orientation of the tool in space with respect to the connector.

The element of the adaptor may include at least one electrical feedthrough that enable power or data to be transmitted between the robot and the tool when the first interface component is mated with the connector and the second interface component is attached to the tool. The element of the adaptor may a plurality of air feedthroughs which enable compressed air to pass between the robot and the tool when the first interface component is mated with the connector and the second interface component is attached to the existing tool. If the adaptor includes an actuator, the actuator may be driven by at least one of electricity, air pressure, water pressure, or magnetism.

In an embodiment, the adaptor can be formed by at least one of: a single material in an injection molding process or a single material created by 3D printing or casting. The element, the second interface, and the tool may form a monolithic block.

In an embodiment, the first interface component may have an eccentric circular perimeter configured to constrain the location and position of the adaptor when the first interface component is mated with the connector. The first interface component may include a volume, enclosed by the element, configured to receive a protruding element of the connector when the first interface component is mated with the connector.

In an embodiment, a method for adapting a tool for robotic use includes providing an adaptor. The adaptor includes an element having a first interface component and a second interface component. The method further includes mating the first interface component to a connector of a robot. The method further includes attaching the second interface component to the tool.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
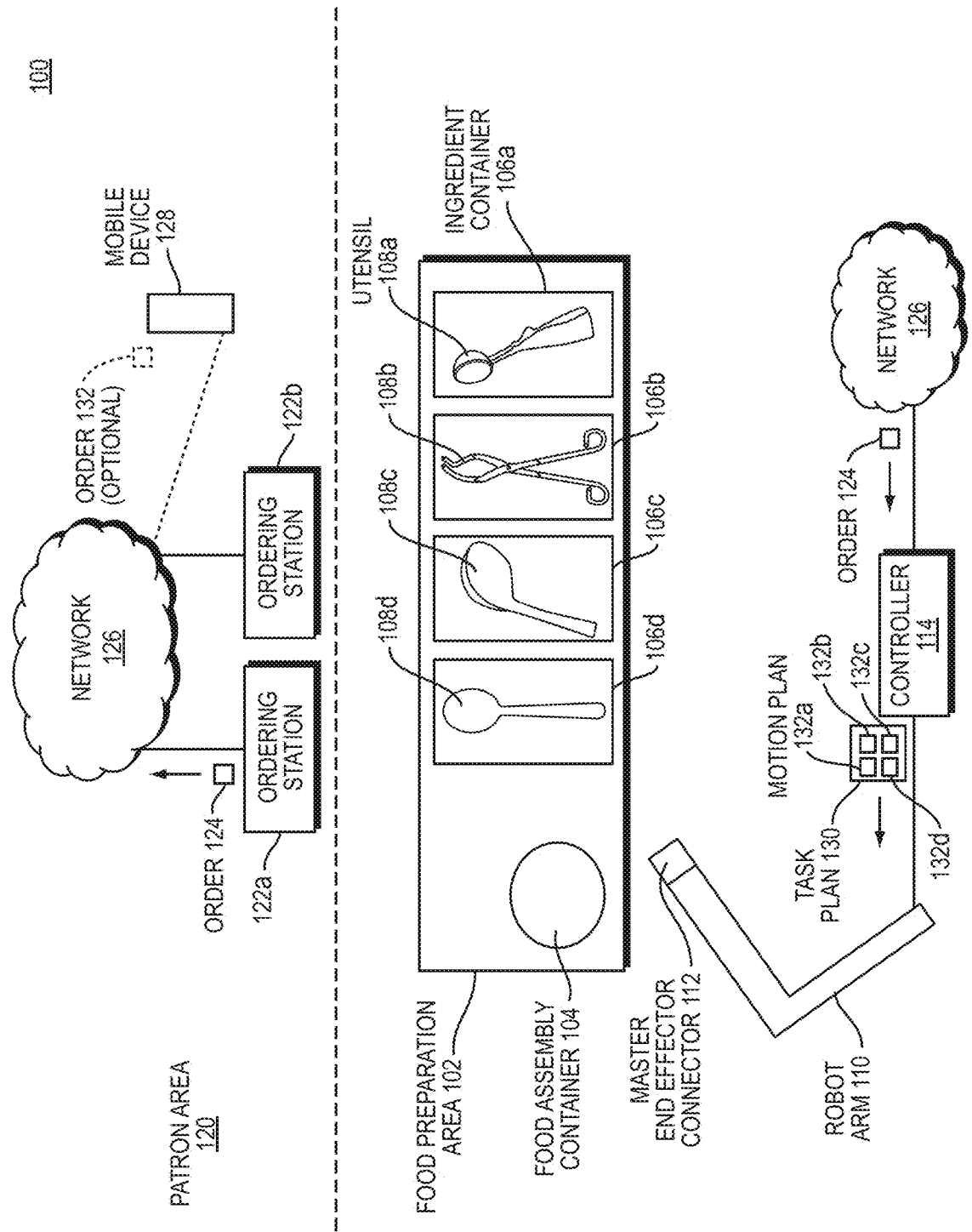
FIG. 1 is a block diagram illustrating an example embodiment of a quick service food environment of embodiments of the present disclosure.

A description of example embodiments follows.

In an embodiment, the present disclosure provides an apparatus and corresponding method that solves problems relating to employing robotics in a food service environment. The apparatus enables safe manipulation of foodstuffs by connecting, to a robot, (1) a tool having a monolithic form factor or (2) an existing tool with an adaptor allowing it to be controlled and used by a robot. The monolithic design enables ease of cleaning and can be designed to be dishwasher safe. The disclosure provides for common or standardized geometry to allow multiple adaptors, for a range of tools, to attach and detach to a common master robotic connector at a flange. In other words, the multiple adaptors, for the range of tools, are compatible with a common master robotic connector. The materials used are food-safe, waterproof and can be compatible with an injection molding process providing a route to cost effective manufacturing. The present disclosure relates to an adaptor attachable to new and existing utensils so that they maintain their original function (e.g., manipulating, preparing, and serving food) while enabling them to be used by a robot.

Operating a robot in a food preparation environment, such as a quick service restaurant, can be challenging for several reasons. First, the end effectors (e.g., utensils), that the robot uses need to remain clean from contamination. Contamination can include allergens (e.g., peanuts), dietary preferences (e.g., contamination from pork for a vegetarian or kosher customer), dirt/bacteria/viruses, or other non-ingestible materials (e.g., oil, plastic, or particles from the robot itself). Second, the robot should be operated within its design specifications, and not exposed to excessive temperatures or incompatible liquids, without sacrificing cleanliness. Third, the robot should be able to manipulate food stuffs, which are often fracturable and deformable materials, and further the robot must be able to measure an amount of material controlled by its utensil in order to dispense specific portions. Fourth, the robot should be able to automatically and seamlessly switch utensils (e.g., switch between a ladle and salad tongs). Fifth, the utensils should be adapted to be left in an assigned food container and interchanged with the robot as needed, in situ. Sixth, the interchangeable parts (e.g., utensils) should be washable and dishwasher safe. Seventh, the robot should be able to autonomously generate a task plan and motion plan(s) to assemble all ingredients in a recipe, and execute that plan. Eighth, the robot should be able to modify or stop a motion plan based on detected interference or voice commands to stop or modify the robot's plan. Ninth, the robot should be able to minimize the applied torque based on safety requirements or the task context or the task parameters (e.g., density and viscosity) of the material to be gathered. Tenth, the system should be able to receive an electronic order from a user, assemble the meal for the user, and place the meal for the user in a designated area for pickup automatically with minimal human involvement.

FIG. 1 is a block diagram illustrating an example embodiment of a quick service food environment 100 of embodiments of the present disclosure. The quick service food environment 100 includes a food preparation area 102 and a patron area 120.

The food preparation area 102 includes a plurality of ingredient containers 106a-d each having a particular foodstuff (e.g., lettuce, chicken, cheese, tortilla chips, guacamole, beans, rice, various sauces or dressings, etc.). Each ingredient container 106a-d stores in situ its corresponding ingredients. Utensils 108a-d may be stored in situ in the ingredient containers or in a stand-alone tool rack 109. The utensils 108a-d can be spoons, ladles, tongs, dishers (scoopers), spatulas, or other utensils. Each utensil 108a-e is configured to mate with and disconnect from a tool changer interface 112 of a robot arm 110. While the term utensil is used throughout this application, a person having ordinary skill in the art can recognize that the principles described in relation to utensils can apply in general to end effectors in other contexts (e.g., end effectors for moving fracturable or deformable materials in construction with an excavator or backhoe, etc.); and a robot arm can be replaced with any computer controlled actuatable system which can interact with its environment to manipulate a deformable material. The robot arm 110 includes sensor elements/modules such as stereo vision systems (SVS), 3D vision sensors (e.g., Microsoft Kinect™ or an Intel RealSense™), LIDAR sensors, audio sensors (e.g., microphones), inertial sensors (e.g., internal motion unit (IMU), torque sensor, weight sensor, etc.) for sensing aspects of the environment, including pose (i.e., X, Y, Z coordinates and roll, pitch, and yaw angles) of tools for the robot to mate, shape and volume of foodstuffs in ingredient containers, shape and volume of foodstuffs deposited into food assembly container, moving or static obstacles in the environment, etc.

To initiate an order, a patron in the patron area 120 enters an order 124 in an ordering station 122a-b, which is forwarded to a network 126. Alternatively, a patron on a mobile device 128 can, within or outside of the patron area 120, generate an optional order 132. Regardless of the source of the order, the network 126 forwards the order to a controller 114 of the robot arm 110. The controller generates a task plan 130 for the robot arm 110 to execute.

The task plan 130 includes a list of motion plans 132a-d for the robot arm 110 to execute. Each motion plan 132a-d is a plan for the robot arm 110 to engage with a respective utensil 108a-e, gather ingredients from the respective ingredient container 106a-d, and empty the utensil 108a-e in an appropriate location of a food assembly container 104 for the patron, which can be a plate, bowl, or other container. The robot arm 110 then returns the utensil 108a-e to its respective ingredient container 106a-d, the tool rack 109, or other location as determined by the task plan 130 or motion plan 132a-d, and releases the utensil 108a-d. The robot arm executes each motion plan 132a-d in a specified order, causing the food to be assembled within the food assembly container 104 in a planned and aesthetic manner.

Within the above environment, various of the above described problems can be solved. The environment 100 illustrated by FIG. 1 can improve food service to patrons by assembling meals faster, more accurately, and more sanitarily than a human can assemble a meal. Some of the problems described above can be solved in accordance with the disclosure below.

Figure 2B:
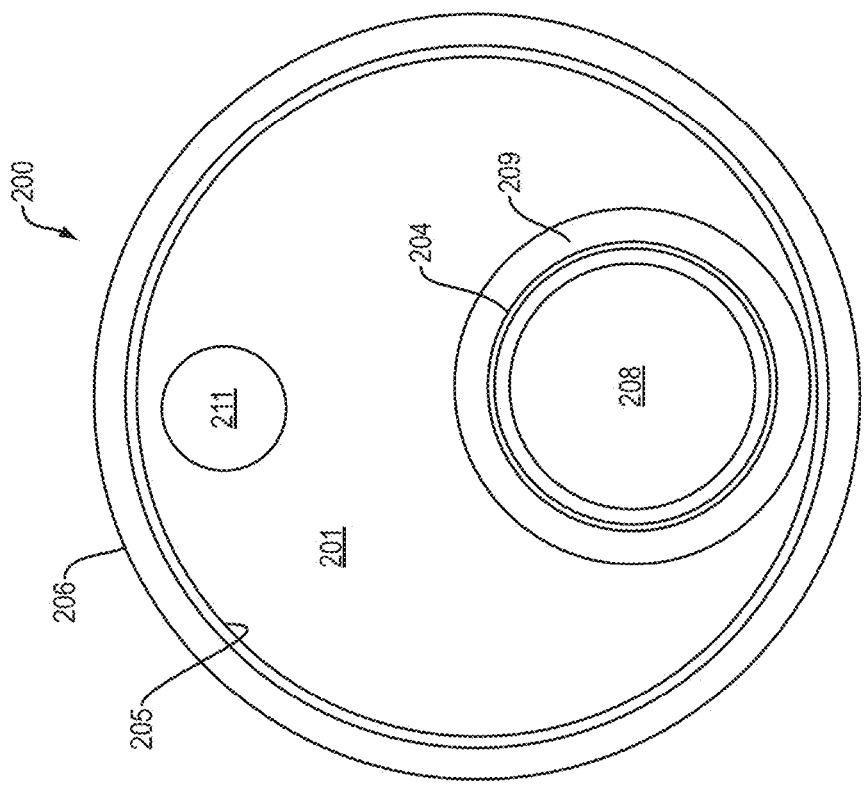
FIG. 2B is a diagram illustrating an example embodiment of the adaptor from a frontal perspective with respect to the side of the adapter that connects with the flange of the robot.
Figure 2A:
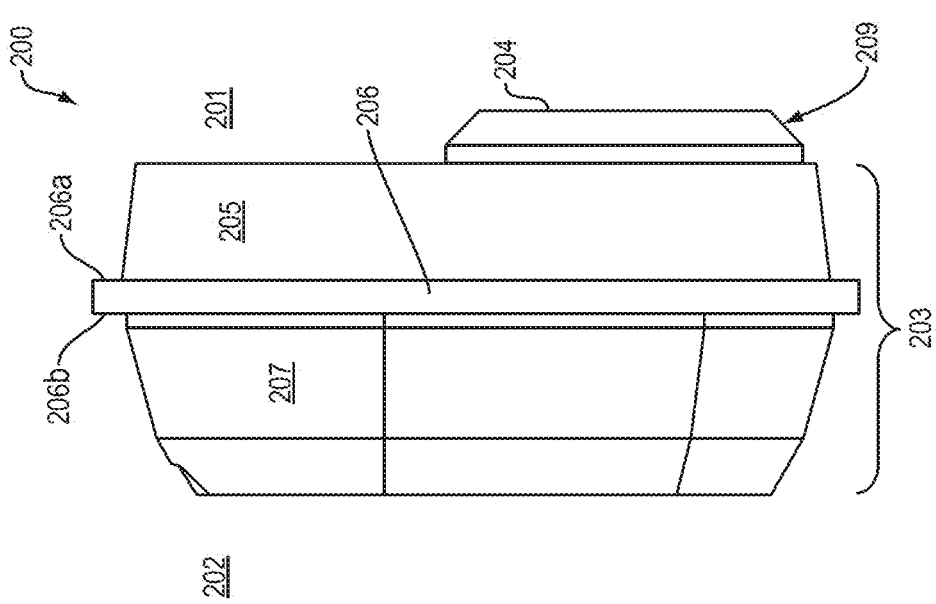
FIG. 2A is a diagram illustrating an example embodiment of an adaptor from a side profile view.

FIG. 2A is a diagram illustrating an example embodiment of an adaptor 200 from a side profile perspective. FIG. 2B is a diagram illustrating an example embodiment of the adaptor 200 from a frontal perspective with respect to the side of the adapter 200 that connects with the flange of the robot. The adaptor 200 has two ends: a robot end 201 and a tool end 202. The robot end 201 and tool end 202 are separated by an adapter body 203. The adaptor body 203 in FIG. 2A has the particular configuration illustrated, but a person having ordinary skill in the art can recognize that the adaptor body 203 may also be any geometry, size, and shape, and further can be composed of any material depending on the needs of the food service environment. The adaptor body 203 may have a unique design for a specific utensil. Alternatively, the adaptor body 203 may have a common design employed for compatibility with all types of tools. The adaptor body 203 may be monolithic in certain embodiments.

The body 203 of adaptor 200, shown in FIGS. 2A-B, includes a circular truncated cone 205 having its upper (e.g., smaller) radius facing the robot end 201 and its lower (e.g., larger) radius attached to a first side 206a of cylinder 206. The radius of cylinder 206 is greater than the lower radius of circular truncated cone 205. Therefore, the profile of the cylinder 206 extends past the profile of the circular truncated cone 205, providing a splash guard protector for food material and a backstop for the connector of the robot when it is mated with first interface 204. A second (e.g., opposite or opposing) side 206b of cylinder 206 is connected to a larger base of a tapered hexagonal prism 207. A smaller base of the tapered hexagonal prism 207 faces tool end 202.

A second interface (not shown in FIGS. 2A and 2B) configured to attach to a tool/utensil can be located on the smaller base of tapered hexagonal prism 207. The adaptor 200 can be connected to any part of a tool by the second interface at tool side 202. The adaptor 200 and the second interface can be configured to attached to any type of desired tool included existing tools and custom designed tools. Elements of adaptor body 203 can be tapered, which allows for the adaptor to be self-locating within a holder using the aid of gravity. The adaptor 200 may also include port 211, which allows the robot to control an actuator attached to adaptor 200 and the actuator employed to create movement in an actuatable utensil attached to the second interface of adaptor 200. Port 211 may be an opening through body 203 that permits a robot on the robot end 201 to control, activate, and/or mechanically manipulate an actuator located at the tool end 202. Port 211 may include elements that hold actuator at a determined position for consistent actuation by and connection with an actuator controller of the robot.

The robot end 201 includes a first interface component 204 configured to removably mate with a robot connector. The robot connector may include a flange that is designed to couple with a first interface component 204. The first interface component 204 is of any size and shape matching the flange of the robot connector, but can have any geometry and location. A person having ordinary skill in the art can recognize that the first interface component 204 may also be any geometry, size, and shape, and further can be composed of any material depending on the needs of the food service environment. For adaptor 200, first interface component 204 is located on the upper base of circular truncated cone 205. The location, position, and orientation of the robot connector controls the location, position, and orientation of the tool attached to adaptor 200 when the interface component 204 mates with the flange of a robot connector. The first interface component 204 of the adaptor 200, shown in FIGS. 2A-B, includes a volume 208 enclosed by a body 203. An entrance to the volume 208 comprises a hollow circular truncated cone 209 protruding from the body 203 at the robot end 201. A hollow circular truncated cone 209 may have a slightly eccentric circumference that constrains the location and position of the adaptor when the first interface component 204 mates with a flange having a matching eccentric circumference.

Figure 2D:
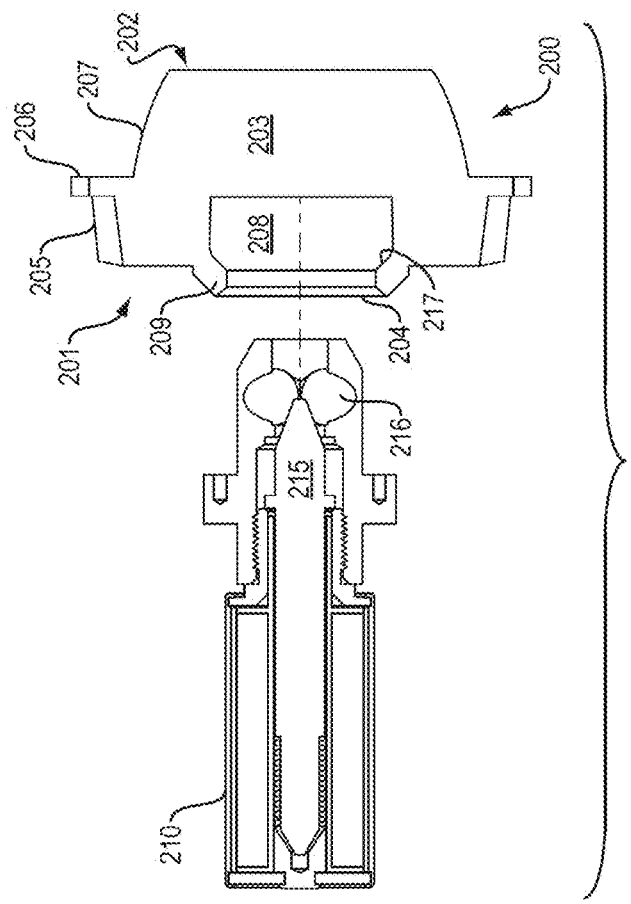
FIGS. 2C-2D are cross-sectional diagrams illustrating an example embodiment of a first interface component of an adaptor mating with an element of a robotic connector.
Figure 2C:
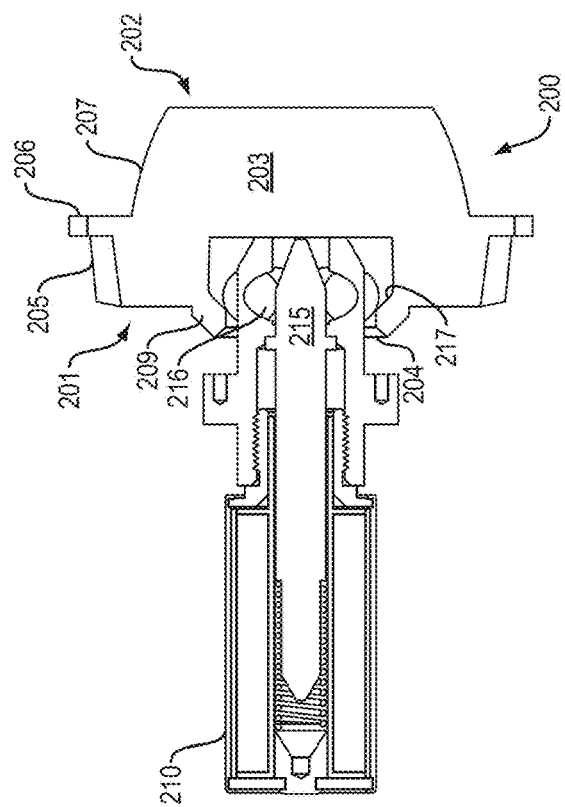

FIGS. 2C-2D are cross-sectional diagrams illustrating an example embodiment of a first interface component of an adaptor mating with an element of a robotic flange. The adaptor 200 illustrated by FIGS. 2C-D has the same dimensions as adaptor 200 show in FIGS. 2A-B. The robot connector includes a protruding element 210 located within a flange. The protruding element 210 has dimensions and geometry that allows it to enter volume 208 and through the interior of hollow circular truncated cone 209 of first interface component 204. Volume 208 receives protruding element 210, which locks into place inside volume 208. To lock protruding element 210 into the first interface, a piston 215 extends through the protruding element 210 into volume 208, and then expands three captive ball bearings 216 in a radial direction. The ball bearings mate to an internally sloped surface 217 on the interior of volume 208, which results in the protruding element 210 being pulled into contact with the bottom of volume 208. To unlock the protruding element 210 from adaptor 200, piston 215 retracts, freeing ball bearings 216 and allows the protruding element 210 to be removed and the robotic flange is disconnected from first interface component 204.

In embodiments, (not illustrated by FIGS. 2C-D), the flange and the robot connector include elements that conform to the surface of robot end 201, circular truncated cone 205, and/or cylinder 206. The first interface component 204 can be coupled with the robot connector in any manner known to one skilled in the art.

In some embodiments, adaptor 200 includes feedthroughs that enable power (e.g., electricity) or data to be transmitted between the robot and the tool when the first interface component is mated with the flange and the second interface component is attached to the utensil. The electrical feedthroughs may be located within adaptor body 203, first interface component 204, or the second interface. In some embodiments, adaptor 200 includes air feedthroughs that enable compressed air to pass between the robot and the utensil when the first interface component is mated with the flange and the second interface component is attached to the existing utensil. The air feedthroughs may be located within at least one of adaptor body 203, first interface component 204, and/or second interface.

Figure 2E:
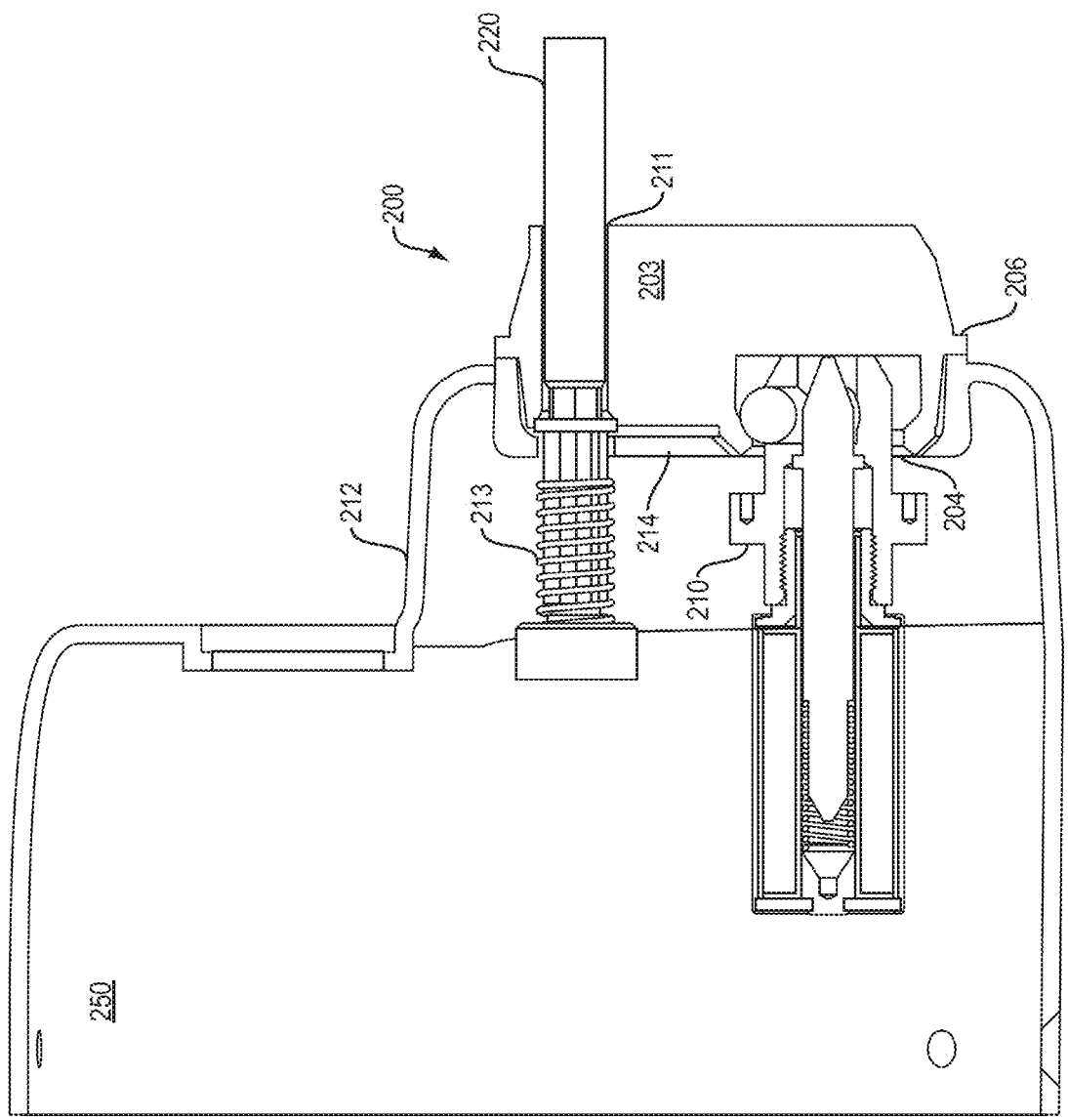
FIG. 2E is a cross-sectional diagram illustrating an example embodiment of an adaptor with an actuator mating with a robot connector.

FIG. 2E is a cross-sectional diagram illustrating an example embodiment of an adaptor 200 with an actuator 220 mating with a robot connector 212. Robot 250 has a connector 212 including a protruding element 210 and a flange 214. The connector 212 mates with first interface component 204 of adaptor 200 using protruding element 210. Connector 212, when mated with first interface component 204, is positioned flush against the protruding portion of cylinder 206 and other surfaces of robot side 201 of adaptor 200. The adaptor 200 includes the actuator 220. The actuator 220 is connected to an actuator controller 213 through port 211. The actuator controller 213, actuator 220, and port 211 may have eccentric shapes to constrain location and ensure a proper connection when the connector 212 mates with the first interface component 204. The actuator controller 213 controls the actuator 220 and use the actuator 220 to manipulate a utensil attached to the adaptor 200. The actuator controller 213 may employ any mechanical, electrical, hydraulic, pneumatic, or other known mechanism to activate and control the actuator 220.

In FIG. 2E, the actuator 220 is a drive shaft that the actuator controller 213 can rotate, however, the actuator 220, the actuator controller 213, and the port 211 may have any geometry and configuration be any size or shape and be made of any material depending upon the utensil actuated and the requirements of the food service environment employing robot 250 and adaptor 200. In other embodiments, the actuator controller 213 is connected to actuator by at least one electrical, water, and/or air feedthrough. The feedthroughs may be connected to actuator 220 and any attached tool through port 211. The feedthroughs may also be external to adaptor 200 and connected to actuator 220 and any attached tool by circumventing adaptor 200.

Figure 3:
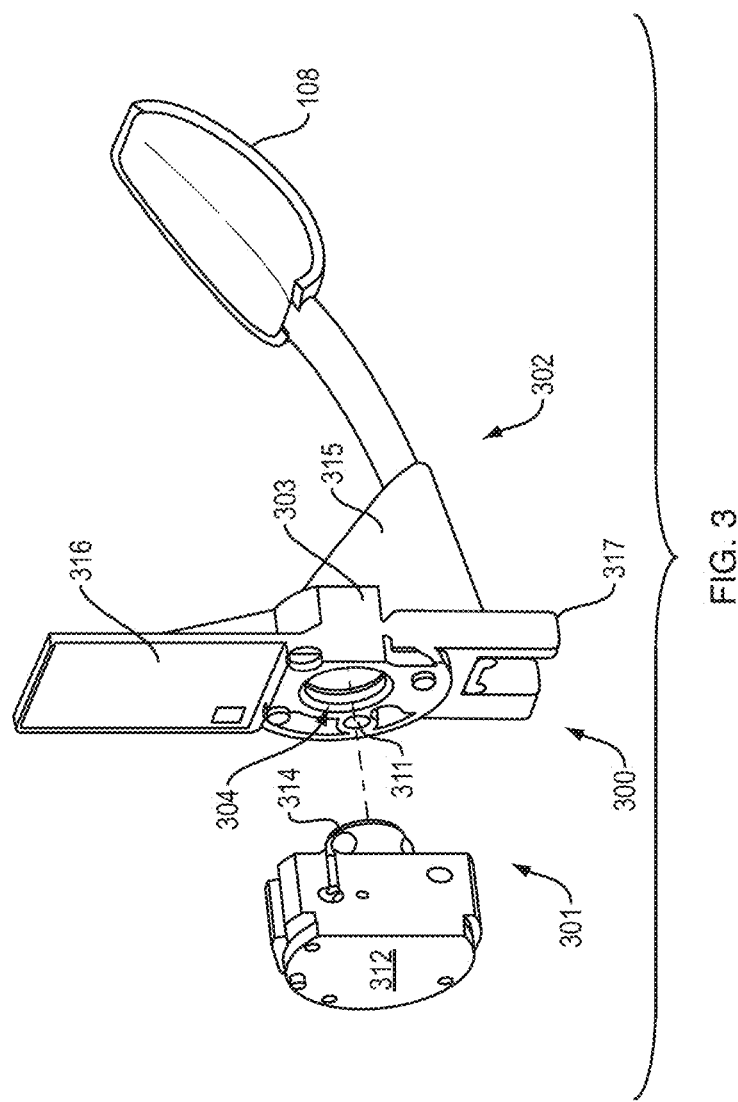
FIG. 3 is a diagram illustrating an example embodiment of a robotic connector mating with a tool with an adaptor.

FIG. 3 is a diagram illustrating an example embodiment of a master robot connector 312 mating with a tool with an adaptor 300. The adaptor 300 is configured to attach the tool 108, a serving spoon, to a robot connector 312 to allow for the control and manipulation of tool 108 by a robot. A robot side 301 of the adaptor 300 mates with the robot connector 312 by connecting a first interface component 304 with a flange 314. The robot connector 312 can connect and disconnect with the adaptor 300 allowing a single robot, through connector 312, to connect to and control multiple tools 108, at different times, having adaptors 300 with first interface components 304 that match flange 314. A person having ordinary skill in the art, however, can recognize that a robot with multiple connectors or flanges can connect to multiple tools simultaneously. The adaptor 300 may include ports 311 employed for rotational alignment, pneumatic signals, electrical modules to carry electrical signals, and/or actuator connections.

The adaptor 300 may also include a visual tag feature for easier recognition by vision systems of the robot. A visual marker/tag 316 is attached to the top of body 303. The visual marker 316 provides the position, orientation, and/or the rotation of the tool 108 and adaptor 300 in space with respect to the robot connector 312, allowing for easier attachment of first interface component 304 with flange 314. In addition, the adaptor body 303 includes a bottom feature 317 that allows tool 108 and adaptor 300 to rest in a consistent location in a food container, even if the food container stores varying levels of food. The bottom feature 317 allows the robot to more easily find and attach to adaptor 300 because it more easily rests in a standard position. In embodiments, the bottom feature 317 can include one or more members extending from the adaptor 300, tool 108, or tool handle configured to latch on to or rest against an edge of a material bin or other element in the environment.

The tool side 302 of the adaptor 300 attaches to the tool 108 through the second interface 315. In some embodiments, the tool 108 is removably attached to the second interface 315. Alternately, the tool 108 can be permanently attached to the second interface 315. In such embodiments, the tool 108 and the adaptor 300 may be composed of a single monolithic block. The tool 108 may be a previously existing utensil with known properties and meeting established safety and cleanliness. The adaptor 300 allows the tool 108, previously designed for human use, to be used and controlled by a robot. Utilizing existing tools instead of designing robot specific tools can provide a simpler, cheaper, and more intuitive way to transition a food service environment from human control to robotic control. Additionally, existing tools have undergone food safety testing and meet other requirements for safe and efficient use.

The tool 108 is a static tool without any joints that require manipulation and can be fully controlled without an actuator. Therefore, the adaptor 300 for use with tool 108, does not include an actuator. The tool 108, when the adaptor 300 is connected to the robot connector 312, can be controlled by changing the location, position, and orientation of the robot connector 312 and be used by the robot to mimic any action a human could take with the tool 108. Specifically, the robot can be configured to use the tool 108 to deliver amounts of food stuff in the food service environment shown in FIG. 1.

In embodiments, including the embodiment illustrated by FIG. 3, for tools 108 that do not require actuation, the tool 108 and adaptor 300 can be monolithic (e.g., have a monolithic design) with at least two features: the adaptor 300 that includes an interface 304 for connecting to a robot connector, and a serving tool body 108. In an embodiment, for tools that do not require actuation, the tool end 302 may be directly connected to a utensil 108 and the entire utensil and adaptor may be a monolithic design. The monolithic design may be formed by at least one of: a single material in an injection molding process or a single material created by 3D printing or casting. Tools that do not require actuation can be manufactured to be truly monolithic, only requiring one component for functionality. The monolithic design can be easy to manufacture and easy to clean. Alternatively, adaptor 300 may be an add-on feature which securely attaches to an existing monolith tool 108 and contains interface 304 for connecting to a robot connector.

Referring to FIG. 1 and FIG. 3, the robot 110 can use the robot connector 112, 312 to connect to utensil 108d having adaptor 300, use utensil 108d to accomplish a task, place it back in container 106d, disconnect from the utensil 108d, attach to utensil 108c, use utensil 108c to accomplish a second task, place utensil 108c back in container 106c, and disconnect to utensil 108d. The adaptor 300 allows for a single robot arm 110 with a master connector 112 to utilize multiple utensils 108a-d, even if the utensils require different manners of operation and connection.

Figure 4A:
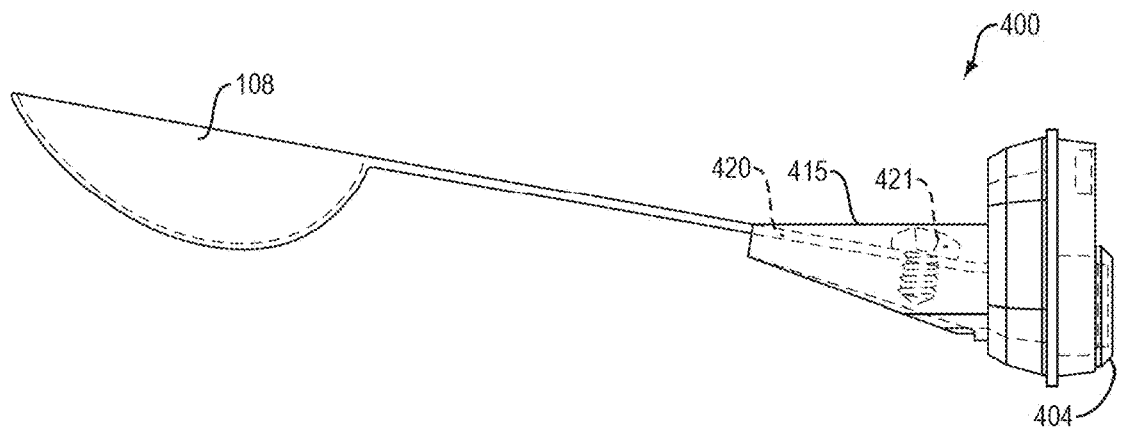
FIG. 4A is a diagram illustrating an example embodiment of an adaptor attached to a serving spoon from a side profile perspective.

FIG. 4A is a diagram illustrating an example embodiment of an adaptor 400 attached to a serving spoon from a side profile perspective. The adaptor 400 is attached to tool 108 through second interface component 415. The adaptor 400 has a first interface component 404 that can removably mate with a flange of the robot connector 112. The tool 108 is a serving spoon with a screw hole at the end of its handle. The second interface component 415 includes, a holder 420 that the handle of tool 108 rests against and a screw 421 that secures the handle of the tool 108 to the holder. The second interface component 415 securely couples the tool 108 to the adaptor 400.

Figure 4B:
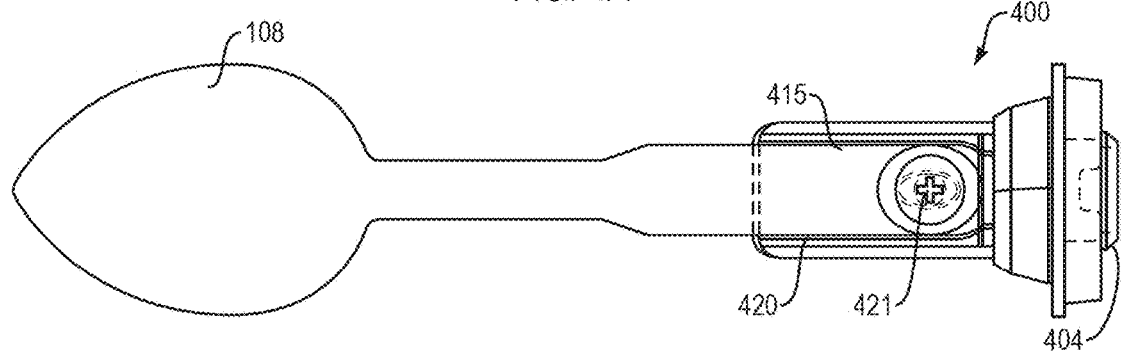
FIG. 4B is a diagram illustrating an example embodiment of an adaptor attached to a serving spoon from an overhead view.

FIG. 4B is a diagram illustrating an example embodiment of an adaptor 400 attached to a serving spoon, as viewed from the above. The adaptor 400 has a second interface 415 designed to attach to the serving spoon 108. The adaptor 400 has a first interface 404 configured to removably mate with a flange of the robot connector 112. Multiple types of adaptors 400 can have different second interfaces 415 designed to attached to a range of tools. These multiple types of adaptors 400 can all have the same first interface 404 configured to attach to the flange of robot connector 112 so that a single robot connector 112 has the ability to connect and control many tools.

Figure 4C:
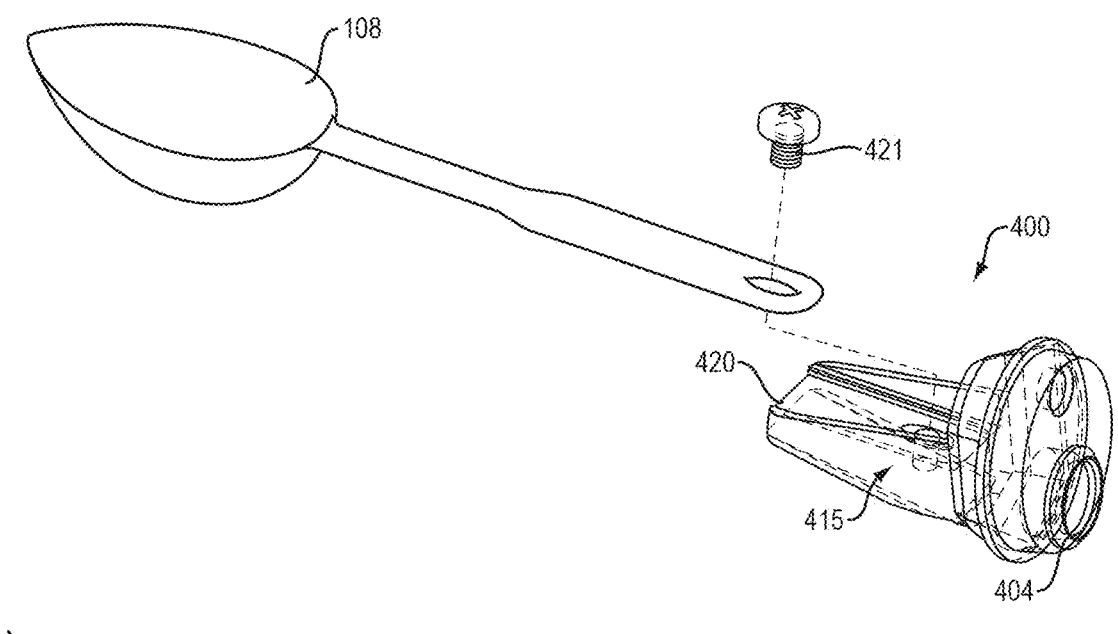
FIG. 4C is an exploded view diagram illustrating an example embodiment of an adaptor attached to a serving spoon in an isometric view.

FIG. 4C is an exploded view diagram illustrating an example embodiment of an adaptor 400 attached to a serving spoon, in an isometric view. FIG. 4C illustrates an existing utensil, the spoon 108, attached to adaptor 400 with modifications that do not affect the performance of the spoon 108. The adaptor 400 can be a monolithic design configured to attach, as an add on, to an existing or slightly modified tool such as the spoon 108.

Actuatable tools are tools that require internal movement to be effectively used, such as tongs, or an ice scream scooper with a dispensing mechanism. To allow the robot to use actuatable tools, the adaptor includes an actuator employed to create movement of elements in the tool. Embodiments include specialized actuators designed to operate any manner of actuatable tools. The actuator may be a linear or rotary actuator configured to create either linear or rotational movement at a joint of an actuatable actual tool. The adaptor may also include a spring to apply a tensile force opposing movement created by the actuator. The tensile force can cause stable movement of the joint and/or provide that the tool returns to a resting position after the desired movement induced by the actuator is completed. The actuator can be mechanical, pneumatic, hydraulic, electrical and utilize any other known method of or apparatus for creating and controlling movement. When the adaptor includes an actuator, an attached tool is controlled by the actuator, and the position, location, and orientation of the robotic connector when the first interface component is mated with the flange of the robot's connector and the second interface component is attached to the actual tool.

Figure 5:
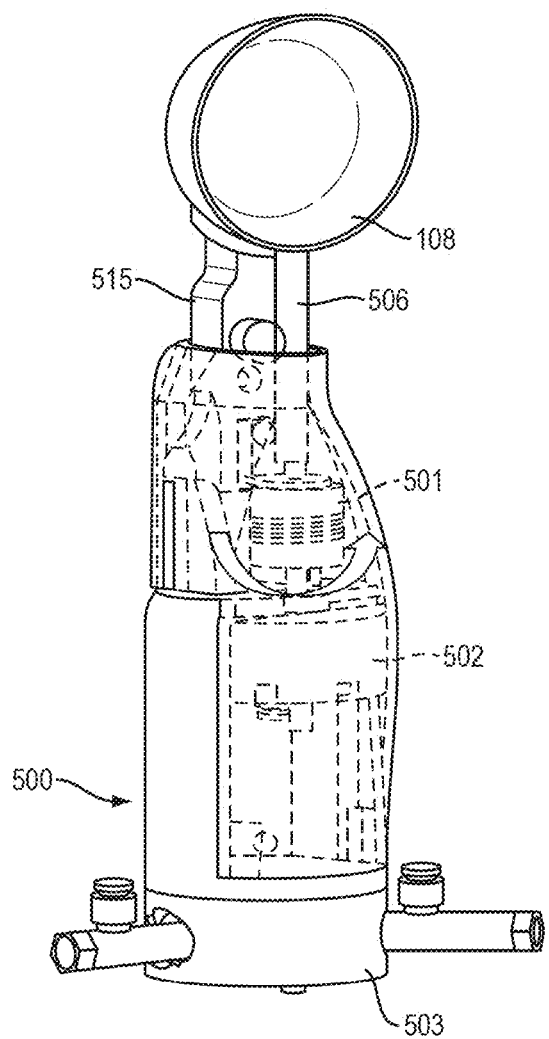
FIG. 5 is a diagram illustrating an example embodiment of an adaptor attached to disher/scooping tool utilizing air pressure to activate an actuator to control a dispensing mechanism.
Figure 5:
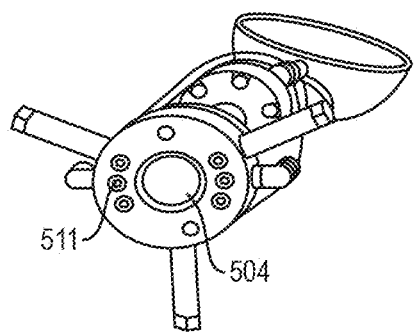

FIG. 5 is a diagram illustrating an example embodiment of an adaptor 500 attached to disher/scooping tool utilizing air pressure to activate an actuator to control a dispensing mechanism. The adaptor 500 includes pneumatic actuator used to activate an element of the disher 108. The body 503 encloses a portion of or all of a pneumatic actuator including a pneumatic rotary actuator 502 and a coupling 501. The pneumatic rotary actuator 502 is mounted to adaptor base 503. The pneumatic rotary actuator 502 is configured to rotate 180 degrees clockwise or counter clockwise using pressurized air. A pneumatic valve is located the robot control equipment and enables the pneumatic rotary actuator 502 to switch between clockwise and counter clockwise rotation. The pneumatic rotary actuator 502 is attached with the pneumatic coupling 501 to a dispensing rod element 506 that scrapes the inside surface of the scooper half-dome 108 to dislodge the foodstuffs when pneumatic rotary actuator 502 is rotated. The pneumatic actuator 502 receives air through the robot connector and ports 511 in the robot side of adaptor 500.

Changing air pressure conditions cause the actuator to create a rotational force inducing movement in a joint of disher 108 that moves the dispensing rod element. A second interface 515 attaches the disher 108 to the body 503 of the adaptor 500 and holds the rest of the disher 108 steady when the pneumatic actuator creates movement. The robot controls the pneumatic actuator when attached to the adaptor 500 at first interface 504 through utilizing air-pressure pass-throughs located in the ports 511. A valve located with the robot control equipment connects to pneumatic actuator 502 and passes air through pass-throughs 511 to actuate the pneumatic actuator 502. One position of the valve rotates the dispensing rod element of disher 108, the other position returns the dispensing rod element to its initial position. The adaptor 500 mates with the robot connector at the first interface 504 to be physically locked to the robot, but also receive air pressure pneumatically. The adaptor 500 also can contain an electric actuator which utilizes electrical pass-throughs from the robot connector.

Figure 6A:
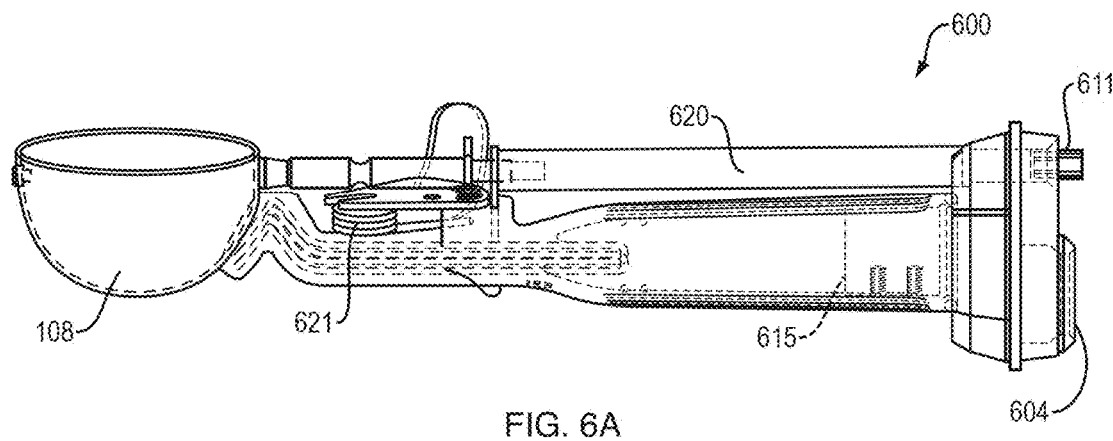
FIG. 6A is a diagram illustrating an example embodiment of an adaptor attached to a disher with a mechanical actuator from a side profile perspective.

FIG. 6A is a diagram illustrating an example embodiment of an adaptor 600 attached to a disher with a mechanical actuator 620 from a side profile perspective.

The adaptor 600 is attached to tool 108 through a second interface component 615. The adaptor 600 includes a first interface component 604 that can removably mate with a flange of robot connector 112. Adaptor 600 also includes an actuator 620 that can be controlled by an attached to and manipulated by a robot through port 611. The tool 108 is a disher utensil used for serving food. Second interface component 615 can securely couple tool 108 to adaptor 600.

Figure 6B:
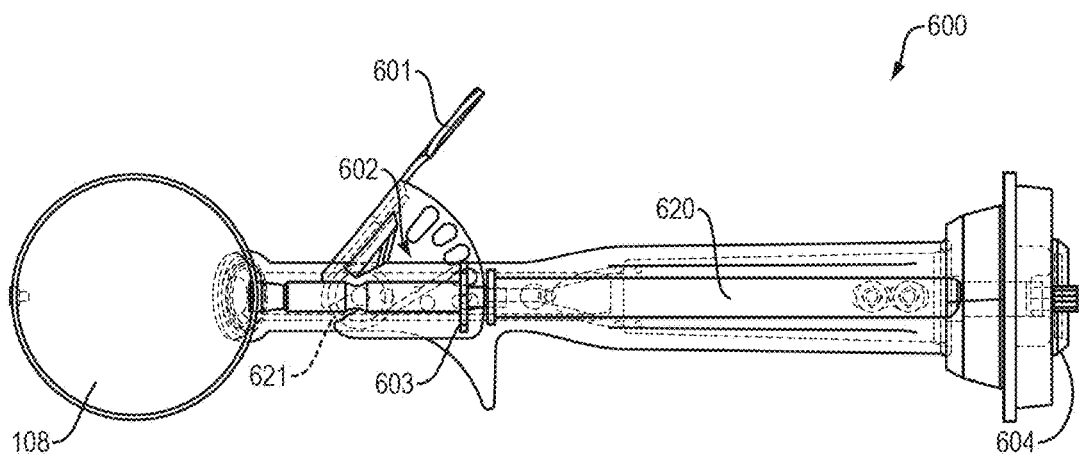
FIG. 6B is a diagram illustrating an example embodiment of the adaptor attached to a disher with a mechanical actuator from an overhead view.

FIG. 6B is a diagram illustrating an example embodiment of the adaptor 600 attached to a disher with a mechanical actuator 620 from an overhead view. Traditionally, applying force on a trigger 601 towards the body of disher 108 actuates the disher 108. The force on the trigger 601 moves rack 602 in a transverse path across the body of the disher 108. In response, the rack 602 mates with the teeth of pinion 603. Movement of rack 602 causes the pinion 603 to rotate. A rod attached to the pinion 603 rotates with the pinion 603, causing an open circular end attached to the shaft to rotate and scrape the surface of the bowl of disher 108, dispensing any food contained in the bowl of the disher 108. Disher 108 includes a torsion 621 spring that returns the scraping bracket to a normal position along the scooping bowl. The actuator 620 is a drive shaft that attached to the pinion 603 at the end of the drive shaft distal from the adaptor 600. When the actuator 620 is rotated, the actuator drive shaft rotates the pinion 603 and mimics the force created by a human pulling the trigger 601 and causes the disher 108 to dispense food contained in the disher bowl in a similar manner. The actuator 620 can be rotated by a motor contained in the robot connector 112 by attaching to the end of the motor through port 611 to a proximate end of the actuator 620. The end of actuator 620 proximate to adaptor 600 can include a gear to allow for manipulation by the robot.

Figure 6C:
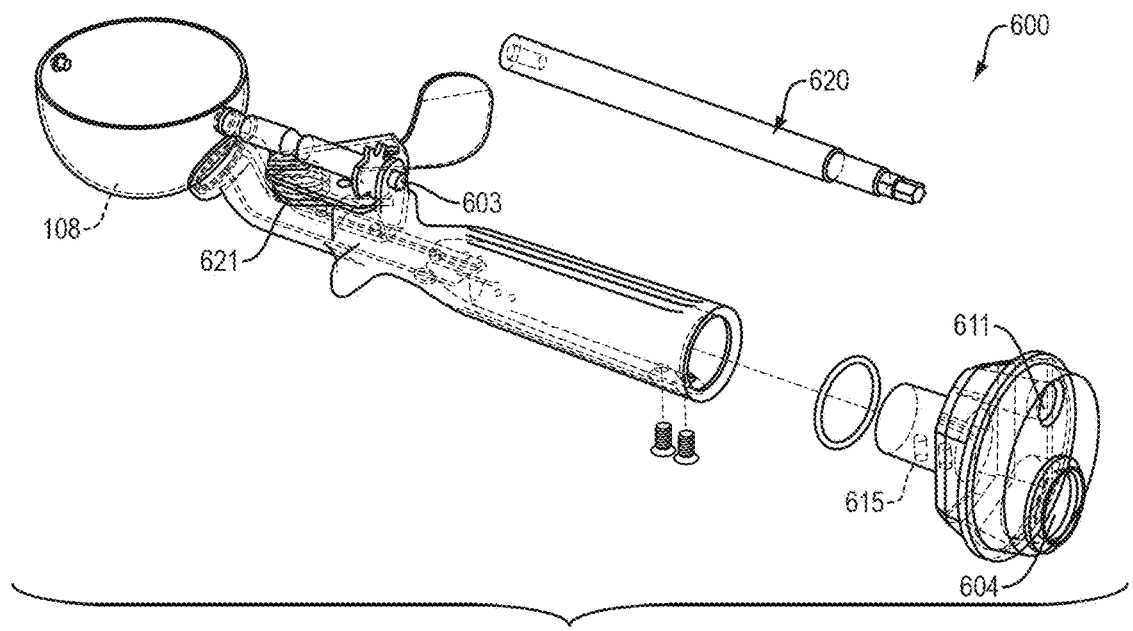
FIG. 6C is an exploded view diagram illustrating an example embodiment of an adaptor attached to a disher with a mechanical actuator in an isometric view

FIG. 6C is an exploded view diagram illustrating an example embodiment of an adaptor 620 attached to a disher with a mechanical actuator in an isometric view. FIG. 6C illustrates an existing utensil, the disher 108, attached to adaptor 600 with modifications that do not impact the performance of the utensil. The base of the disher 108 is removed, relative to FIGS. 6A-B, and second interface 615 is placed within a handle of disher 108. The disher 108 is secured to the second interface 615 with a pair of screws and corresponding securing screw holes. A person having ordinary skill in the art can understand that corresponding nuts, bolts, washers, etc. can be necessary to secure the disher 108 to the second interface 615. The adaptor 600, including first and second interfaces 604 and 615, can be monolithic. In an embodiment, the only modification of the disher 108 is the addition of the securing screws and removal of the base.

For tools that require actuation, such as disher 108, the first interface component 604 attachable to the robot master connector, the second interface component 615 attachable to the tool 108, and also accommodate mounting features for the required 620 may all be included in a monolithic design.

Figure 7:
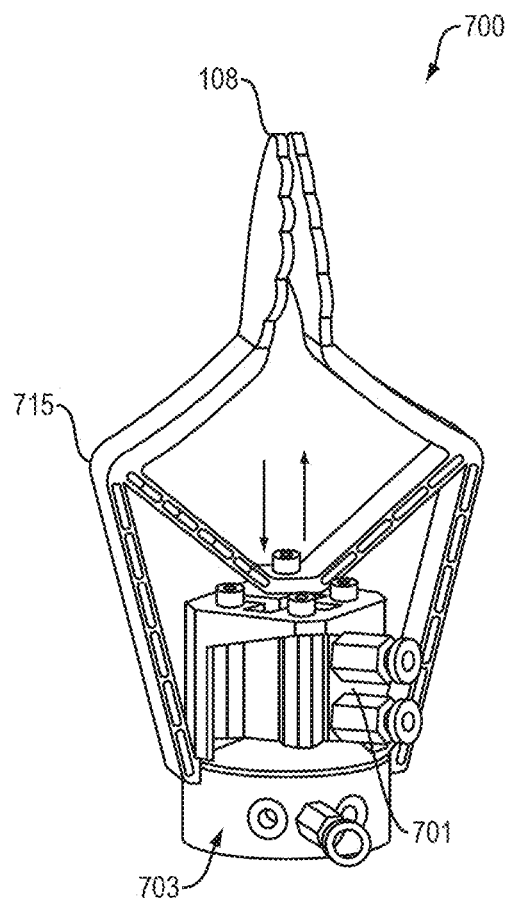
FIG. 7 is a diagram illustrating an example embodiment of an adaptor attached to tong tool utilizing air pressure to activate an actuator to control the tong movement.
Figure 7:
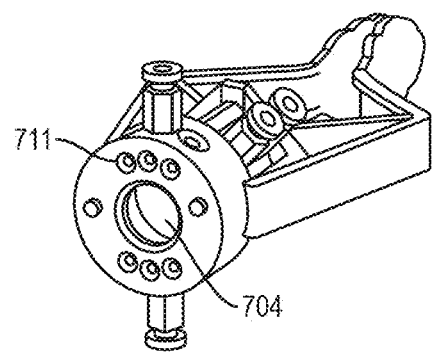

FIG. 7 is a diagram illustrating an example embodiment of an adaptor 700 attached to tong tool utilizing air pressure to activate an actuator to control the tong movement. A linear pneumatic actuator 701 is attached to the adaptor body 703. Second interface component 715 is configured to attach to a set of tongs 108 and is a deformable flexure structure. The robot controls the pneumatic actuator when the robot is attached to adaptor 700 at first interface 704 by utilizing air-pressure pass-throughs located in ports 711. The adaptor 700 mates with the robot connector at first interface 704 to be physically locked to the robot and to receive air pressure pneumatically. A valve located with the robot control equipment connects to pneumatic cylinder 702 and passes air through pass-throughs 711 to actuate the pneumatic cylinder 702. One position of the valve causes the pneumatic cylinder 702 move outwards to open the tongs, and the other position of the value uses the pneumatic cylinder 702 move inwards to close the tongs with a gripping force. The adaptor 700 also can contain an electric actuator or hydraulic actuator, instead of a pneumatic actuator, for utilizing electrical or water pass-throughs from the robot connector.

Figure 8:
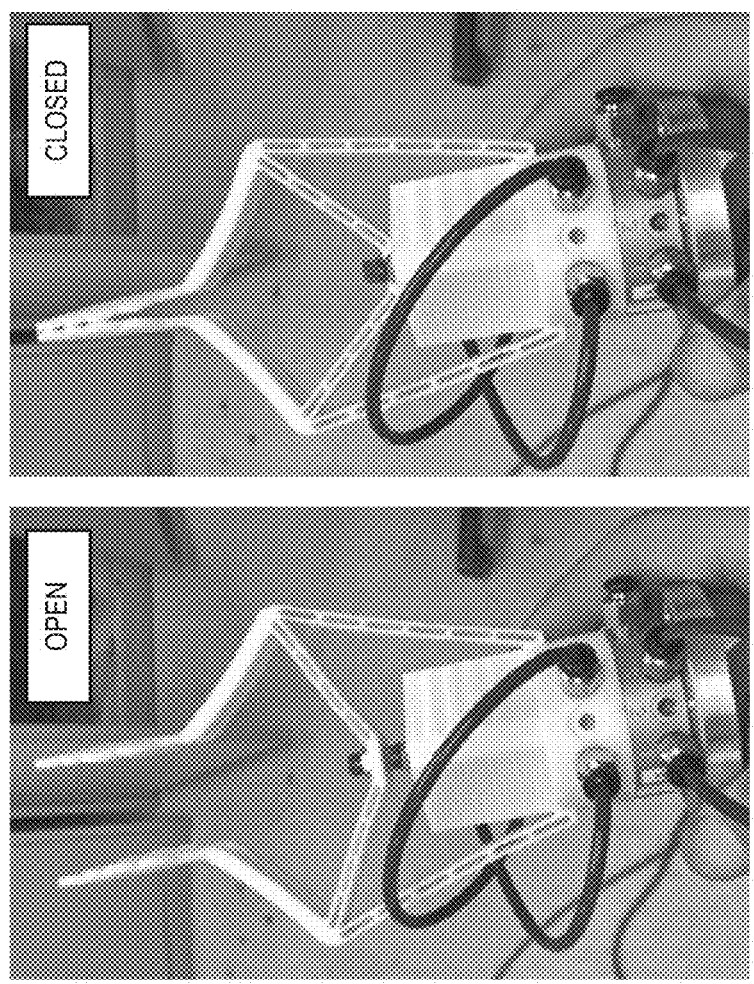
FIG. 8 is a picture of an example embodiment of an adaptor attached to tong tool utilizing air pressure to activate an actuator to control the tong movement in an open and closed position.

FIG. 8 is a picture of an example embodiment of an adaptor attached to tong tool utilizing air pressure to activate an actuator to control the tong movement in an open and closed position. The embodiment illustrated by FIG. 8 is a monolithic design, where the tongs and adaptor body are created from a single material.

Figure 9A:
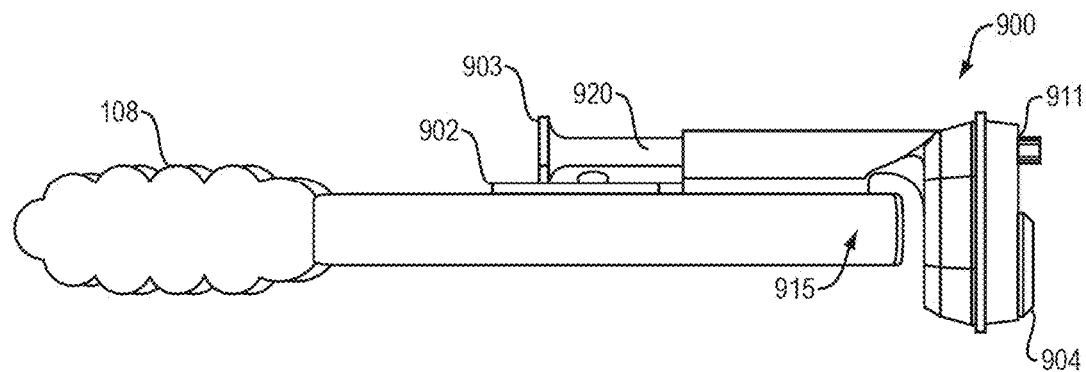
FIG. 9A is a diagram illustrating an example embodiment of an adaptor attached to a pair of tongs with a mechanical actuator from a side profile perspective.

FIG. 9A is a diagram illustrating an example embodiment of an adaptor 900 attached to a pair of tongs with a mechanical actuator 920 from a side perspective. The adaptor 900 is attached to the tool, a pair of tongs 108, through second interface component 915. The second interface component 915 attaches to the side of each tong 108a and 108b. The adaptor 900 includes a first interface component 904 that can removably mate with a flange of robot connector 112. The adaptor 900 also includes actuator 920 that can be controlled by an attached robot through port 911. The tool 108 is a pair of tongs utensil employed for serving food. The second interface component 915 may have any set of components, geometry, shape, or size and be made of any material that can securely couple tool 108 to adaptor 900.

Figure 9B:
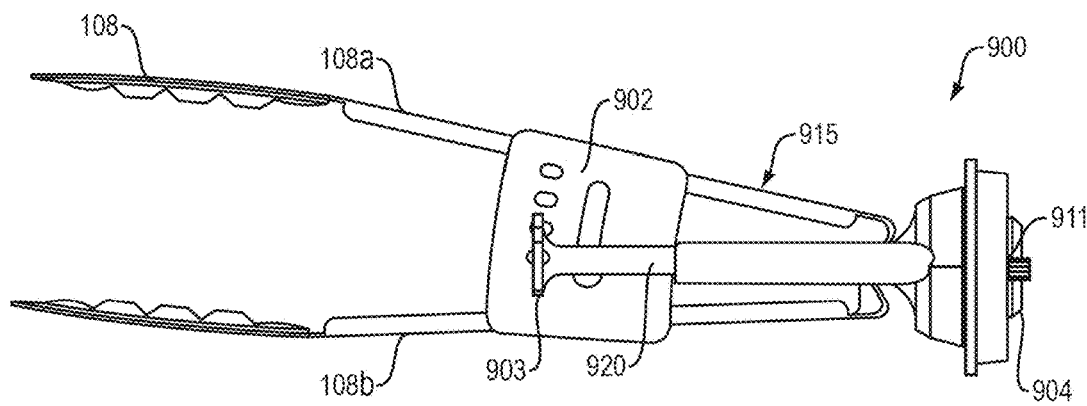
FIG. 9B is a diagram illustrating an example embodiment of an adaptor attached to a pair of tongs with a mechanical actuator from an overhead view

FIG. 9B is a diagram illustrating an example embodiment of an adaptor 900 attached to a pair of tongs with a mechanical actuator 920, from an overhead view. A traditional, manually operated, pair of tongs, composed of two individual tongs connected at a base, are actuated by the manual user applying force on outer sides of each tong, which creates a resulting gripping force between the tong ends. In an embodiment, a pair of tongs 108, composed two individual tongs 108a and 108b connected at their base by a living hinge, are actuated by applying force on the outer sides of each tong 108a and 108b to create the gripping force between the tong ends through robotic means. As described above, the force on outer sides of each tong 108a and 108b is created by a human user's hand squeezing the tongs 108 using traditional, manually operated tongs. The living hinge at the base tongs 108a and 108b applies the force to return the tongs 108 a and 108b to their open position when the squeezing force is removed. In some embodiments, the hinge is pinned and includes a torsion spring opposing the squeezing force. In a robotic setting, the actuator 920 is a drive shaft attached to pinion 903 at the end of the drive shaft distal from the body of adaptor 900. The teeth of pinion 903 are interlocked with the rack 902. The rack 902 is part of second interface component 915 and is securely attached to tong 108a but not attached to tong 108b. When the actuator 920 is rotated, the actuator drive shaft rotates pinion 903 and causes rack 902 to move in a transverse motion across the unattached tong 108b. The transverse motion of rack 902 creates a force on the attached tong 108a towards the unattached tong 108b creating a gripping force between the tong ends. The gripping force can be lessened or terminated by reversing the rotation of the drive shaft of actuator 920. The actuator 920, can be rotated by a motor contained in the robot connector 112 by attaching to the end proximate end of actuator 920 of the motor through port 911. The end of actuator 920 proximate to adaptor 900 can include a gear to allow for manipulation by the robot. The teeth of pinion 903, location of rack 902, and the restorative force of the living hinge return the tongs to a normal position and can be used to ensure the drive shaft of actuator 920 has the correct orientation for connecting to the motor contained in the robot connector 112.

Figure 9C:
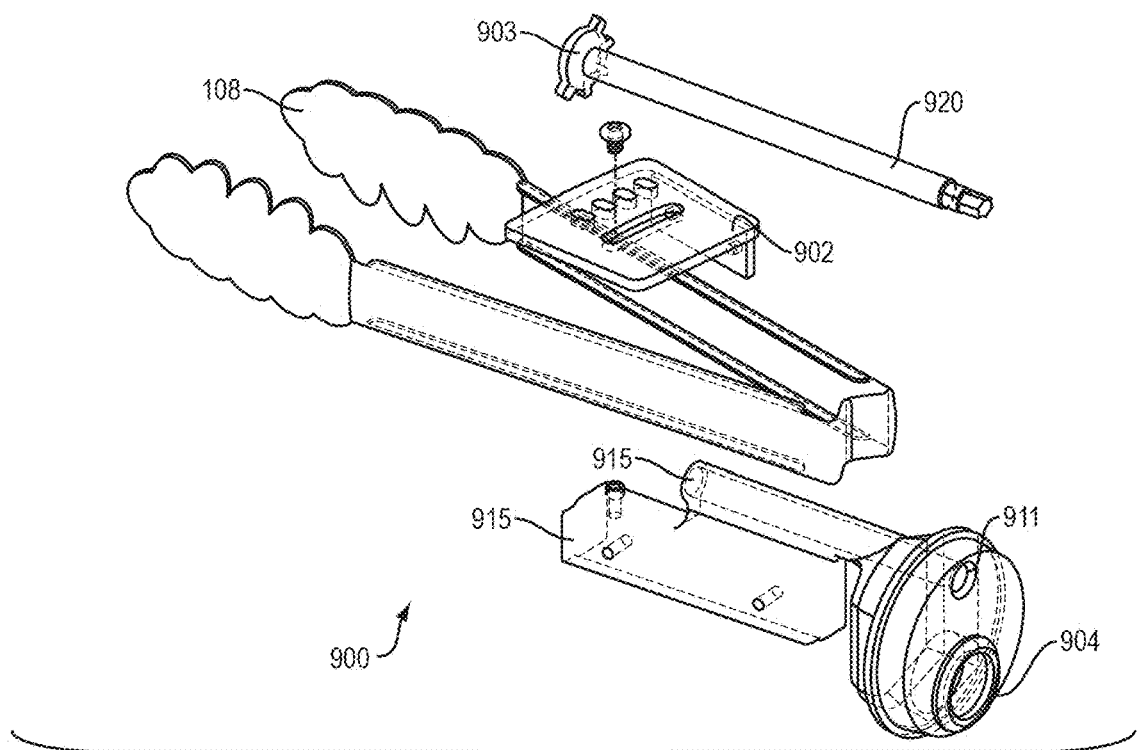
FIG. 9C is an exploded view diagram illustrating an example embodiment of an adaptor attached to a pair of tongs with a mechanical actuator in an isometric view.

FIG. 9C is an exploded view diagram illustrating an example embodiment of an adaptor 900 attached to a pair of tongs with a mechanical actuator 920, from an isometric view. FIG. 9C illustrates how an existing utensil, the pair of tongs 108, is attached to adaptor 900 with modifications that do not affect its performance. The outside surface of each tong 108*a* and 108*b* proximate to their attached base are placed against a flat protruding surface of second interface 915. Tongs 108*a* and 108*b* are each secured to second interface 915 with a screw. The Tong 108*a* is also attached to rack 902 using screws. In an embodiment, the only modification of tongs 108 is the addition of the securing screws and other securing hardware (e.g., nuts, bolts, washers, etc.).

Adaptor 900, including first and second interfaces 904 and 915, can be monolithic. For tools that require actuation, such as tongs 108, the first interface component 904 attachable to the robot connector, the second interface component 915 attachable to the tool 108, and also according mounting features for the required actuator may all be included in a monolithic design.

Figure 10:
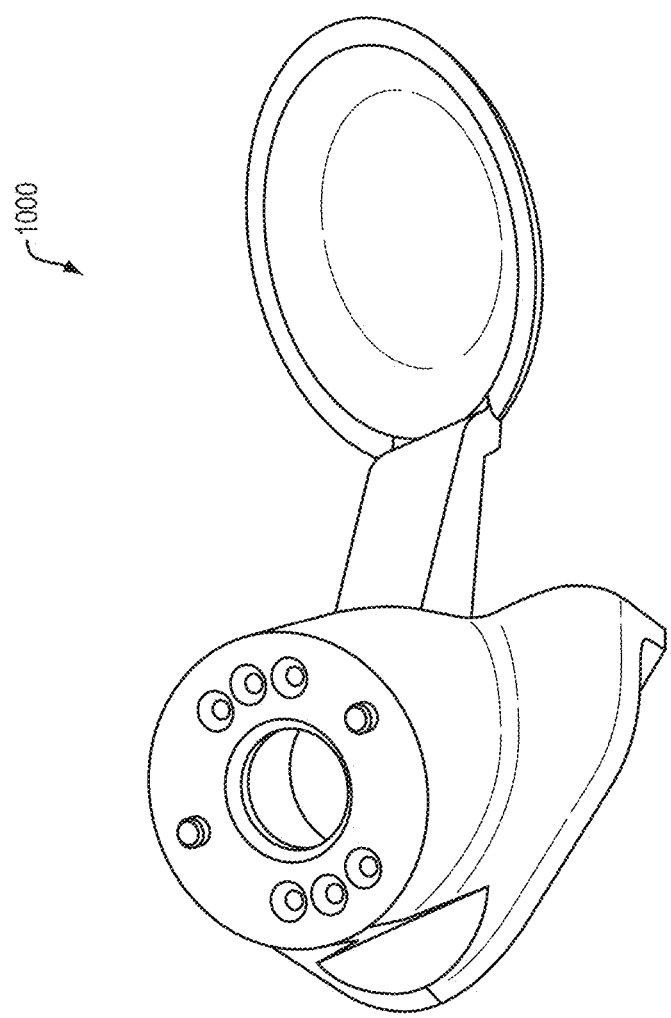
FIG. 10 is a diagram illustrating an example embodiment of a monolithic tool and adaptor that does not require actuation.

FIG. 10 is a diagram illustrating an example embodiment of a monolithic tool that does not require actuation. Embodiments of the disclosure can utilize elements composed of, or be entirely made from, a variety of foodsafe and/or waterproof plastics, including food-safe polycarbonate, PC-ISO, for use on a Stratasys Fortus 3D-printing machine. One of the novel features of the disclosure is the ability to combine the adaptor with the tool body as illustrated by FIG. 10, for example.

Embodiments of the disclosure, including embodiments utilizing monolithic designs, can be manufactured using 3D printing technology. Complex geometries can be rapidly fabricated and combined into functional prototypes. Additional features (e.g., bin clocking and visual tag alignment) are cost effective and can be rapidly incorporated into designs. Embodiments of the disclosure can also use of any other known printing machines and plastic material. Further, food service applications are, generally speaking, low-load. This enables the usage of 3D printed plastic materials without need for large supporting structures. Many of the available tool changers are over-designed to work in higher load applications. Injection moldings are also possible in embodiments, and other food-safe plastics and/or waterproof can be used for elements or the entirety of the adaptor, such as high-density polyethylene (HDPE), polyethylene terephthalate (PET) or polycarbonate. In addition, compatible designs can also be fabricated with injection molding processes. For designs that do not require actuation, the tool and adaptor can be completely monolithic.

In one embodiment of the disclosure a plastic food-safe and water proof adaptor can be attached to an existing metal, or other material, tool. Alternatively, both the adaptor and the tool can be composed of a plastic food-safe and water proof material either as separate pieces or as a monolithic design incorporating both the adaptor and tool. For utensils requiring actuation, actuators can be moved from the tool and/or adaptor to a robotic connector master that has these additional actuation capabilities. Removing the actuator from the tool/adaptor would enable actuatable tool designs such as the scooper and tongs to be truly monolithic. Finally, the adaptor and tool either their entirety or their individual elements can be composed of at least one of, nylon, stainless steel, aluminum, and/or silicone.

Currently, prior art adaptors such as ATI QC-11 can be mated to spoons and ladles. However, unlike the adaptor of the disclosure the prior art adaptors require significant rewording of the tools to be used. Other prior art solutions use new hand-like tools (i.e. shadow hand from the Shadow Robot Company), however, these are currently not at a state of reliability to be used in the near future, especially in a food environment and cannot take advantage of the known qualities of existing tools and utensils.

Flippy, the burger flipping robot by Miso Robotics, employs reworked spatulas and grill scrapers mounted to metallic tool changers to tool change. However, these reworked spatulas are not a cost effective, long-term solution. Further, prior art adaptors require multiple connectors to fasten multiple pieces together can be a cause of later mechanical failure, and in addition can create hard to clean areas and allow microbes to grow. Also, using many components over a more monolithic, sealed design is more difficult to clean and exposes crevices for microbes to develop. The present disclosure's designs reduce the number of components required for functionality. This reduction in individual components is beneficial to improve assembly time, cost effectiveness and improves cleanability (e.g., less crevices for microbes to develop). Changes to the tool geometry can be rapidly implemented and produced into a functional article if 3D printing fabrication methods are used. Designing an adaptor as a monolithic component further provides flexibility advantages, such as the air passthroughs can be used, blocked, or left exposed entirely.

Figure 11:
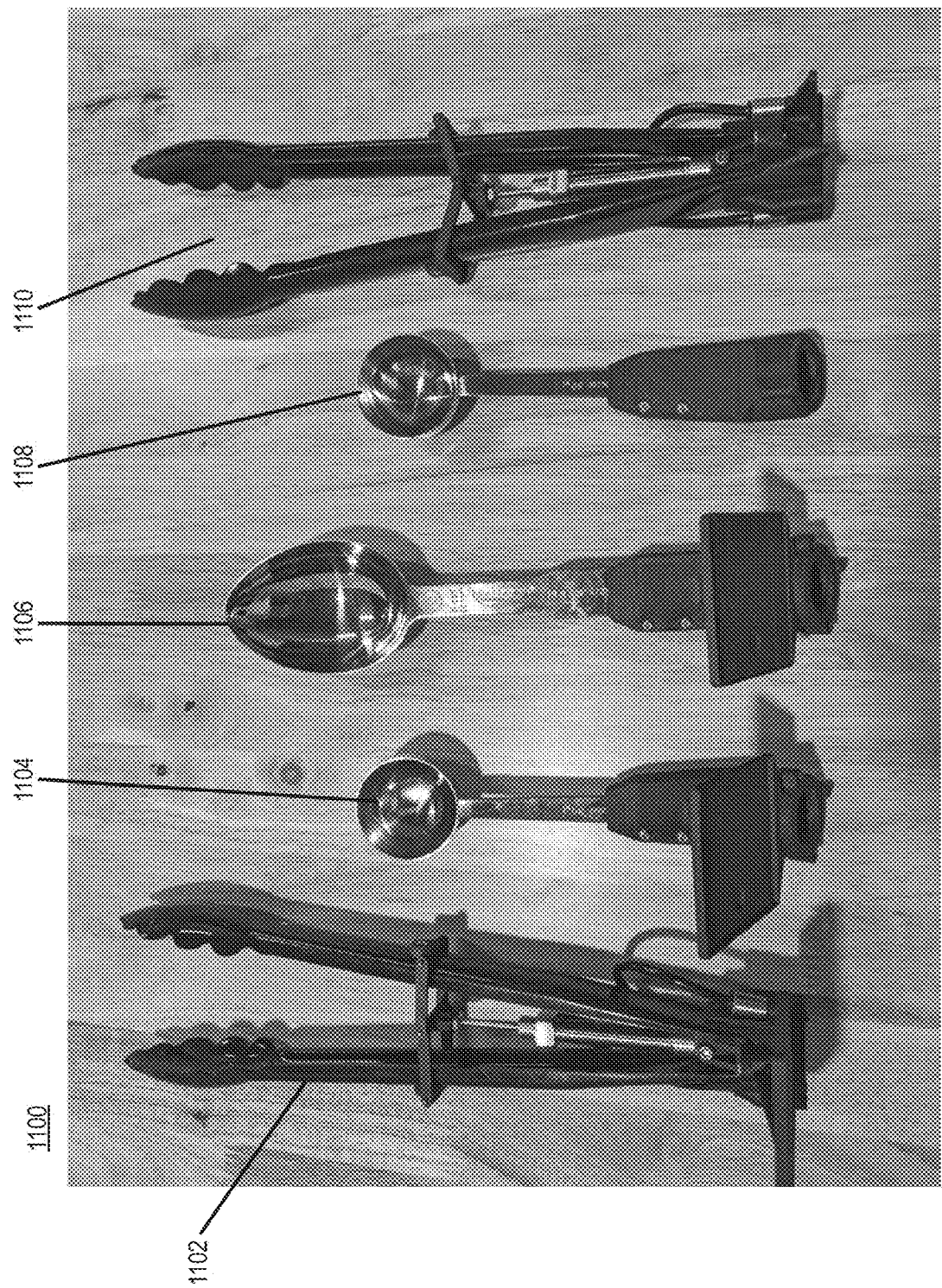
FIG. 11 is a picture of example embodiments of the present disclosure for a set of food preparation and serving tools.

FIG. 11 is a picture of embodiments of the present disclosure for a set of food preparation and serving tools 1100. The tools 1102, 1103, 1106, 1108, 1110 can be repurposed regular kitchen tools simply attached to an adaptor. For example, the ice cream scooper 1104 is an ice cream scoop attached to an adaptor at its handle. Further, tools 1102, 1104, and 1106 include a visual tag feature on its tool changer interface. Because the adaptors attached to tools 1102, 1103, 1106, 1108, 1110 have the same first interface component configured to removably mate with a flange of a robot connector, tools 1102, 1103, 1106, 1108, 1110 can all be utilized by a single robot arm as shown in the service environment of FIG. 1. Additionally, because the disclosure's adaptor allows tools 1102, 1103, 1106, 1108, 1110 to be repurposed regular kitchen tools the transition from a human operated service environment to a robotic operated service environment is far simpler, cheaper, and streamlined than if the highly modified or newly designed tools are required to function.

Figure 12:
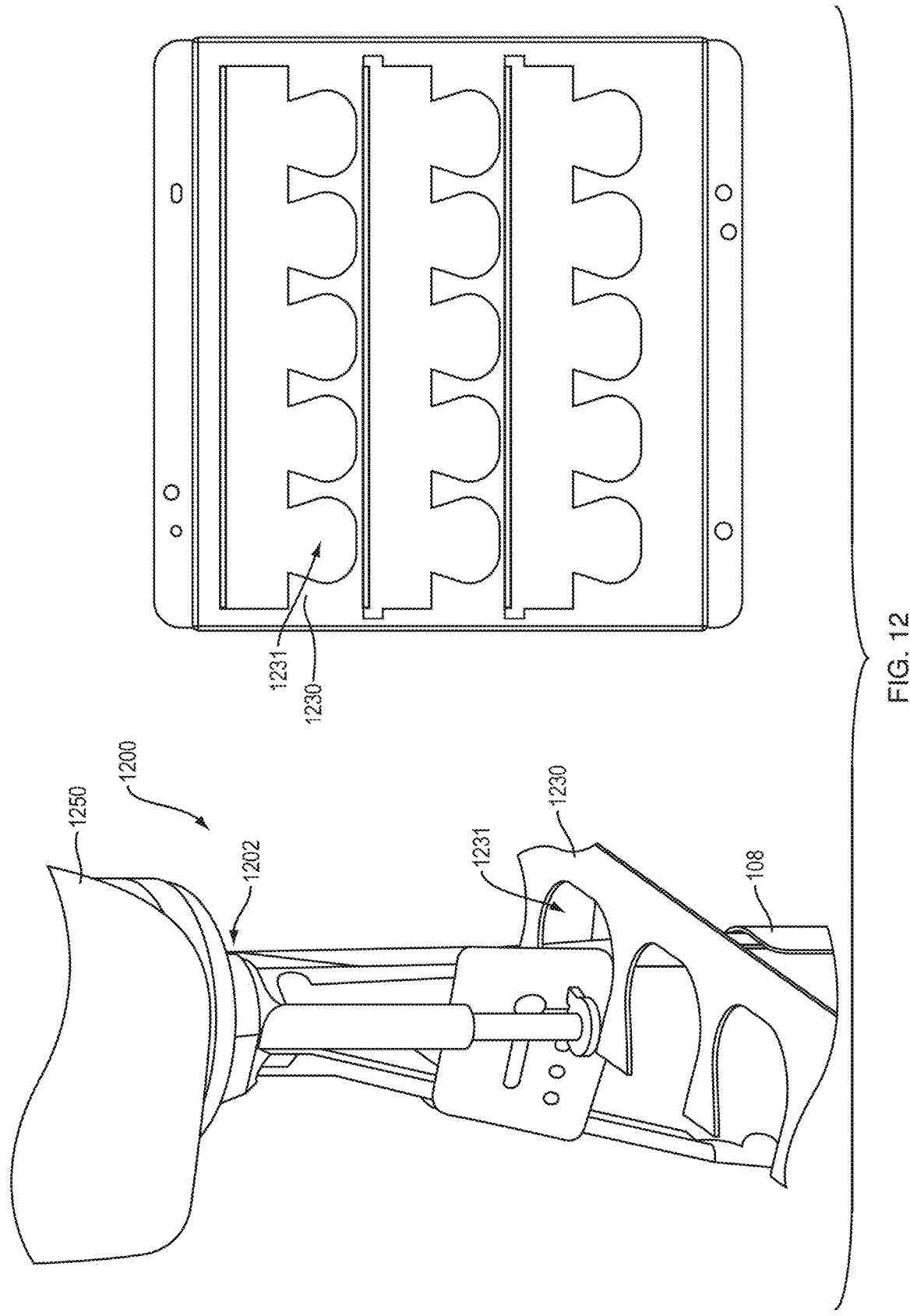
FIG. 12 is a diagram illustrating an example embodiment of an adaptor with storage rack.

FIG. 12 is a diagram illustrating an example embodiment of an adaptor 1200 with storage rack 1230. In some embodiments, the adaptor 1200 includes a tool end 1202 configured to interface with an opening 1231 of storage rack 1230. Robot 1250 connects to the adaptor 1200 attached to tool 108 while adaptor 1200 is held by opening 1231 of storage rack 1230. After robot 1250 connects to the adaptor 1200, it can employ tool 108. When robot 1250 no longer needs tool 108, it places the adaptor 1200 back in opening 1231 of storage rack 1230 and disconnects from the adaptor 1200. Tool 108 remains in opening 1231 of storage rack 1230 after the robot 1250 disconnected. The storage rack 1230 can include multiple openings 1231 for holding a range of tools with adaptors configured to removably mate with robot 1250.

Figure 13:
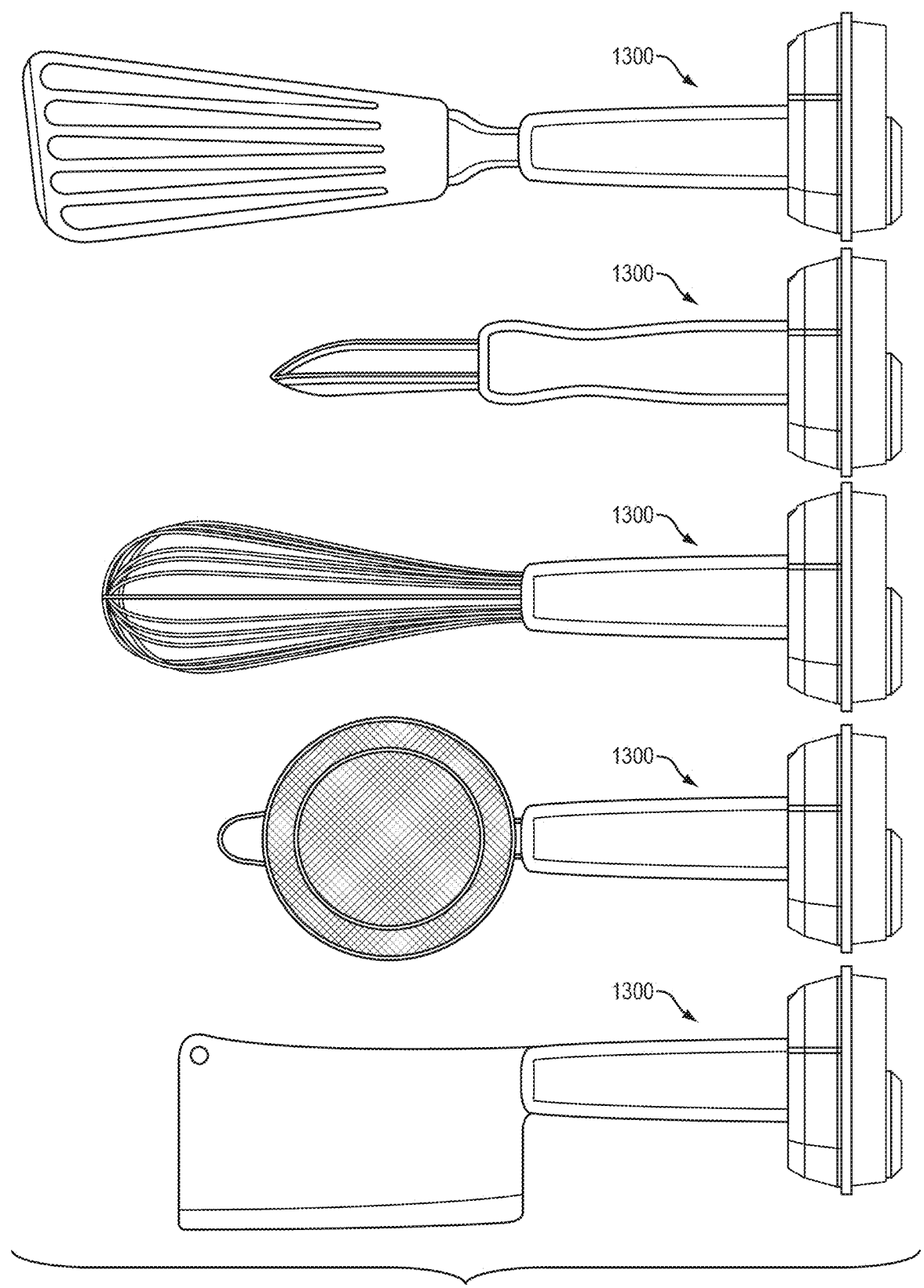
FIG. 13 is a diagram illustrating example embodiments of adaptors attached to a set of static tools.

FIG. 13 is a diagram illustrating example embodiments of adaptors 1300 attached to a set of static tools. The disclosure's adaptor can be configured to attach to and permit a robot to control and manipulate a wide range of static tools.

Figure 14:
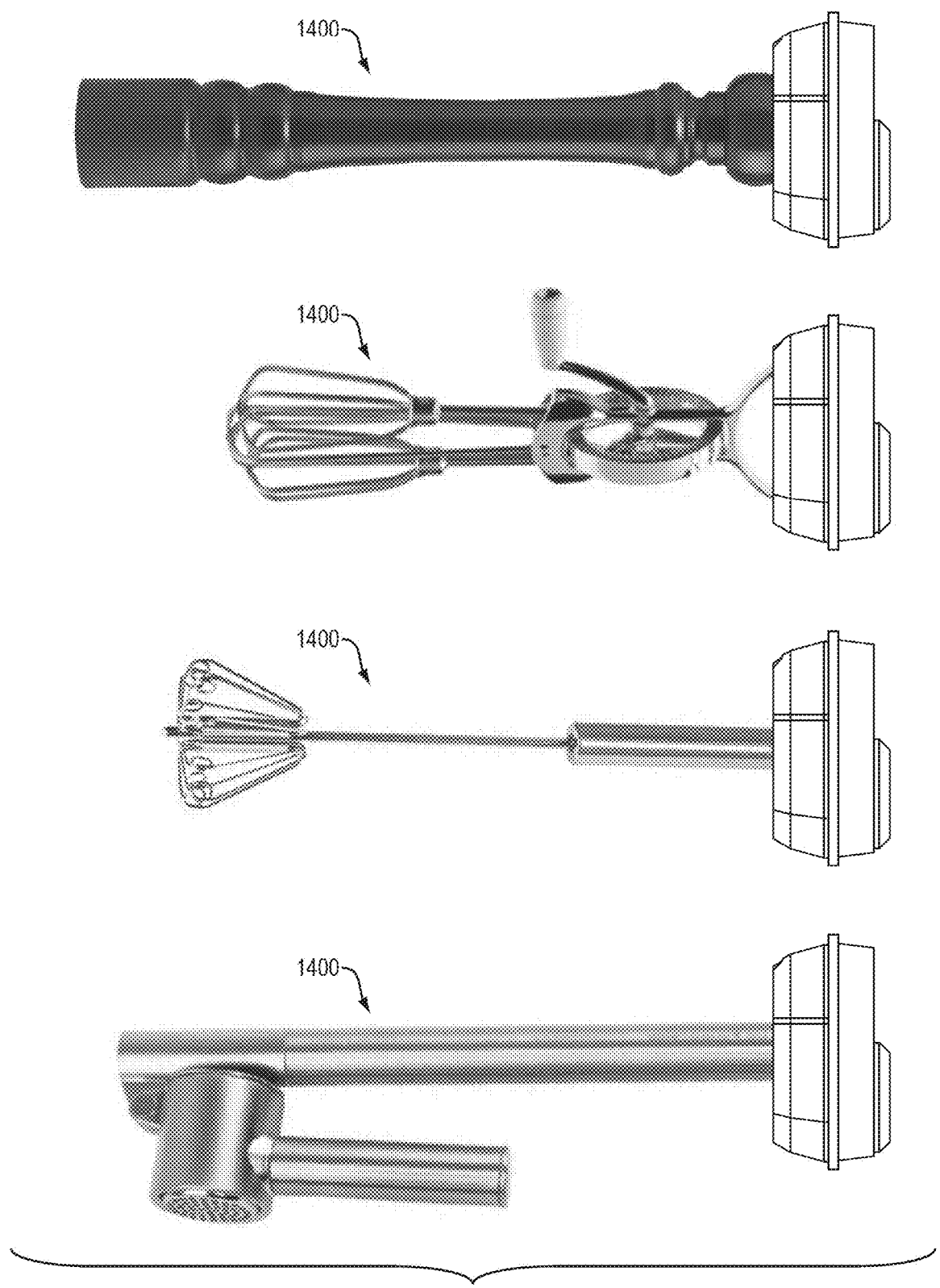
FIG. 14 is a diagram illustrating example embodiments of adaptors attached to a set of actuatable tools.

FIG. 14 is a diagram illustrating example embodiments of adaptors 1400 attached to a set of actuatable tools. The disclosure's adaptor can be configured to attach to and permit a robot to control and manipulate a wide range of actuatable tools.

The teachings of all patents, published applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. An adaptor comprising:
   an element having a first interface component and second interface component wherein:
   the first interface component is configured to removably mate with a connector of a robot, where the first interface component includes a volume, enclosed by the element, configured to receive a protruding element of the connector when the first interface component is mated with the connector; and
   the second interface component is configured to attach to a tool.

2. The adaptor of claim 1, where the tool is controllable by moving the connector when the first interface component is mated with the connector and the second interface component is attached to the tool.

3. The adaptor of claim 2, where the tool is one of a spatula, rake, peeler, whisk, strainer, knife, ladle, or spoon.

4. The adaptor of claim 1, wherein the tool is an actuatable tool, and the adaptor further comprises:
   an actuator, coupled to the element such that the actuator can be controlled by the robot when the first interface component is mated with the connector and the actuatable tool is controllable by moving the connector and the actuator when the first interface component is mated with the connector and the second interface component is attached to the actuatable tool.

5. The adaptor of claim 4, where the actuatable tool is one of a spice mill, egg beater, frother, crusher, tongs, disher, or ice cream scooper.

6. The adaptor of claim 4, where the actuator is coupled to the element at a port, the port configured to allow a connection between the connector and the actuator when the first interface component is mated with the connector.

7. The adaptor of claim 4, wherein the actuator is a linear actuator configured to move a joint of the attached actuatable tool.

8. The adaptor of claim 4, wherein the actuator is a rotary actuator configured to move a joint of the attached actuatable tool.

9. The adaptor of claim 8, wherein the rotary actuator includes:
   a drive shaft having a proximal end coupled to the element, and having a distal end having a pinion; and
   a rack, coupled to the second interface component, configured to mate with the pinion of the drive shaft, and further configured to apply force to the joint of the actuatable tool through the second interface component when the drive shaft is rotated and the second interface component is attached to the actuatable tool.

10. The adaptor of claim 4, further comprising a spring configured to apply a tensile force opposing movement created by the actuator.

11. The adaptor of claim 4, where the actuator is driven by at least one of electricity, air pressure, water pressure, or magnetism.

12. The adaptor of claim 1, further comprising a visual marker attached to the element configured to provide, to an imaging system at least one of the position and the orientation of the tool in space with respect to the connector.

13. The adaptor of claim 1, where the element includes at least one electrical feedthrough that enable power or data to be transmitted between the robot and the tool when the first interface component is mated with the connector and the second interface component is attached to the tool.

14. The adaptor of claim 1, where the element further includes a plurality of air feedthroughs which enable compressed air to pass between the robot and the tool when the first interface component is mated with the connector and the second interface component is attached to the existing tool.

15. The adaptor of claim 1, where the adaptor is formed by at least one of: a single material in an injection molding process or a single material created by 3D printing or casting.

16. The adaptor of claim 1, where the element, the second interface and tool form a monolithic block.

17. The adaptor of claim 1, where the first interface component has an eccentric circular perimeter configured to constrain the location and position of the adaptor when the first interface component is mated with the connector.

18. A method for adapting a tool for robotic use, the method comprising:
   providing an adaptor, the adaptor including an element having a first interface component and a second interface component, the first interface component including a volume enclosed by the element;
   mating the first interface component to the connector of the robot, the first interface component configured to receive a protruding element of the connector when the first interface component is mated with the connector; and
   attaching the second interface component to the tool.

19. The method of claim 18, wherein the tool is an actuatable tool, and providing the adaptor further includes:
   providing an actuator, coupled to the element such that the actuator can be controlled by the robot when the first interface component is mated with the connector and the actuatable tool is controllable by moving the connector and the actuator.

20. An adaptor comprising:
   an element having a first interface component and second interface component wherein:
   the first interface component is configured to removably mate with a connector of a robot;
   the second interface component is configured to attach to a tool; and
   an actuator, coupled to the element such that the actuator can be controlled by the robot when the first interface component is mated with the connector and the actuatable tool is controllable by moving the connector and the actuator when the first interface component is mated with the connector and the second interface component is attached to the actuatable tool, where the actuator is coupled to the element at a port, the port configured to allow a connection between the connector and the actuator when the first interface component is mated with the connector.

21. An adaptor comprising:

an element having a first interface component and second interface component wherein:

the first interface component is configured to removably mate with a connector of a robot;

the second interface component is configured to attach to a tool; and a visual marker attached to the element configured to provide, to an imaging system at least one of the position and the orientation of the tool in space with respect to the connector.

22. An adaptor comprising:

an element having a first interface component and second interface component wherein:

the first interface component is configured to removably mate with a connector of a robot;

the second interface component is configured to attach to a tool; and where the adaptor is formed by at least one of: a single material in an injection molding process or a single material created by 3D printing or casting.

23. An adaptor comprising:

an element having a first interface component and second interface component wherein:

the first interface component is configured to removably mate with a connector of a robot;

the second interface component is configured to attach to a tool; and where the element, the second interface and tool form a monolithic block.

24. An adaptor comprising:

an element having a first interface component and second interface component wherein:

the first interface component is configured to removably mate with a connector of a robot, where the first interface component has an eccentric circular perimeter configured to constrain the location and position of the adaptor when the first interface component is mated with the connector; and the second interface component is configured to attach to a tool.

\* \* \* \* \*